US012730761B2

(12) United States Patent
Parker et al.

(10) Patent No.: US 12,730,761 B2
(45) Date of Patent: Sep. 8, 2026

(54) PROTECTING EXECUTION ENVIRONMENTS WITHIN DOMAINS USING ENCRYPTION ENVIRONMENT ID TO GENERATE ENCRYPTION KEY

(71) Applicant: Arm Limited, Cambridge (GB)

(72) Inventors: Jason Parker, Sheffield (GB); Yuval Elad, Cambridge (GB); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/859,261

(22) PCT Filed: Mar. 16, 2023

(86) PCT No.: PCT/GB2023/050615
§ 371 (c)(1),
(2) Date: Oct. 23, 2024

(87) PCT Pub. No.: WO2023/209320
PCT Pub. Date: Nov. 2, 2023

(65) Prior Publication Data

US 2025/0265202 A1 Aug. 21, 2025

(30) Foreign Application Priority Data

Apr. 28, 2022 (GB) ..................................... 2206218

(51) Int. Cl.
*G06F 12/14* (2006.01)
*G06F 12/1009* (2016.01)

(52) U.S. Cl.
CPC ...... *G06F 12/1441* (2013.01); *G06F 12/1009* (2013.01); *G06F 12/1475* (2013.01)

(58) Field of Classification Search
CPC ............. G06F 12/1441; G06F 12/1009; G06F 12/1475
See application file for complete search history.

(56) References Cited

U.S. PATENT DOCUMENTS 6,351,795 B1 * 2/2002 Hagersten ........... G06F 11/0712 711/E12.066
2020/0201786 A1 * 6/2020 Ouziel ................ G06F 12/0246
(Continued)

FOREIGN PATENT DOCUMENTS

EP 3614284 2/2020
EP 3671521 A1 6/2020
(Continued)

OTHER PUBLICATIONS

Bedichek, "Some Efficient Architecture Simulation Techniques," Department of Computer Science, FR-35 University of Washington, Seattle, Washington 98195.
(Continued)

*Primary Examiner* — Chie Yew
(74) *Attorney, Agent, or Firm* — NIXON & VANDERHYE P.C.

(57) ABSTRACT

There is provided an apparatus that includes processing circuitry for performing processing in one of a fixed number of at least two domains. One of those domains is subdivided into a variable number of execution environments and memory protection circuitry uses a key input to perform encryption or decryption on the data of a memory access request issued to a memory address from within a current one of the domains. The key input is different for each of the domains and for each of the execution environments, the key input for each of the domains is fixed at boot time of the apparatus, and the key input for each of the execution environments is dynamic.

18 Claims, 25 Drawing Sheets

(56) References Cited

U.S. PATENT DOCUMENTS

| | | | | |
|---|---|---|---|---|
| 2020/0310972 | A1 | 10/2020 | Shanbhogue et al. | |
| 2021/0089466 | A1* | 3/2021 | Shanbhogue ....... | G06F 9/45558 |
| 2021/0328789 | A1* | 10/2021 | Hosur .................. | H04L 9/0894 |

FOREIGN PATENT DOCUMENTS

| | | | |
|---|---|---|---|
| GB | 2594062 | A | 10/2021 |
| WO | 2021/191576 | | 9/2021 |

OTHER PUBLICATIONS

International Search report and the written opinion for International Application No. PCT/GB2023050615, dated Jun. 22, 2023.

Combined Search and Examination Report for GB2206218.6, dated Dec. 2, 2022.

Office Action for IN Application No. 202417081246 dated Jan. 29, 2026, 12 pages.

* cited by examiner

PROTECTING EXECUTION ENVIRONMENTS WITHIN DOMAINS USING ENCRYPTION ENVIRONMENT ID TO GENERATE ENCRYPTION KEY

The present technique relates to data processing.

A data processing system may have address translation circuitry to translate a virtual address of memory access request to a physical address corresponding to a location to be accessed in a memory system.

Viewed from a first example configuration, there is provided an apparatus comprising: processing circuitry configured to perform processing in one of a fixed number of at least two domains, one of the domains being subdivided into a variable number of execution environments; and memory protection circuitry configured to use a key input to perform encryption or decryption on the data of a memory access request issued to a memory address from within a current one of the domains, wherein the key input is different for each of the domains and for each of the execution environments; the key input for each of the domains is fixed at boot time of the apparatus; and the key input for each of the execution environments is dynamic.

Viewed from a second example configuration, there is provided a method comprising: performing processing in one of a fixed number of at least two domains, one of the domains being subdivided into a variable number of execution environments; and using a key input to perform encryption or decryption on the data of a memory access request issued to a memory address from within a current one of the domains, wherein the key input is different for each of the domains and for each of the execution environments; the key input for each of the domains is fixed at boot time of the apparatus; and the key input for each of the execution environments is dynamic.

Viewed from a third example configuration, there is provided a computer program for controlling a host data processing apparatus to provide an instruction execution environment for execution of target code; the computer program comprising: processing program logic configured to simulate processing of the target code in one of at least two domains, one of the domains being subdivided into a variable number of execution environments; and memory protection logic configured to use a key input to perform encryption or decryption on the data of a memory access request issued to a memory address from within a current one of the domains, wherein the key input is different for each of the domains and for each of the execution environments; the key input for each of the domains is fixed at boot time of the apparatus; and the key input for each of the execution environments is dynamic.

The present technique will be described further, by way of example only, with reference to embodiments thereof as illustrated in the accompanying drawings, in which.

Figure 3:
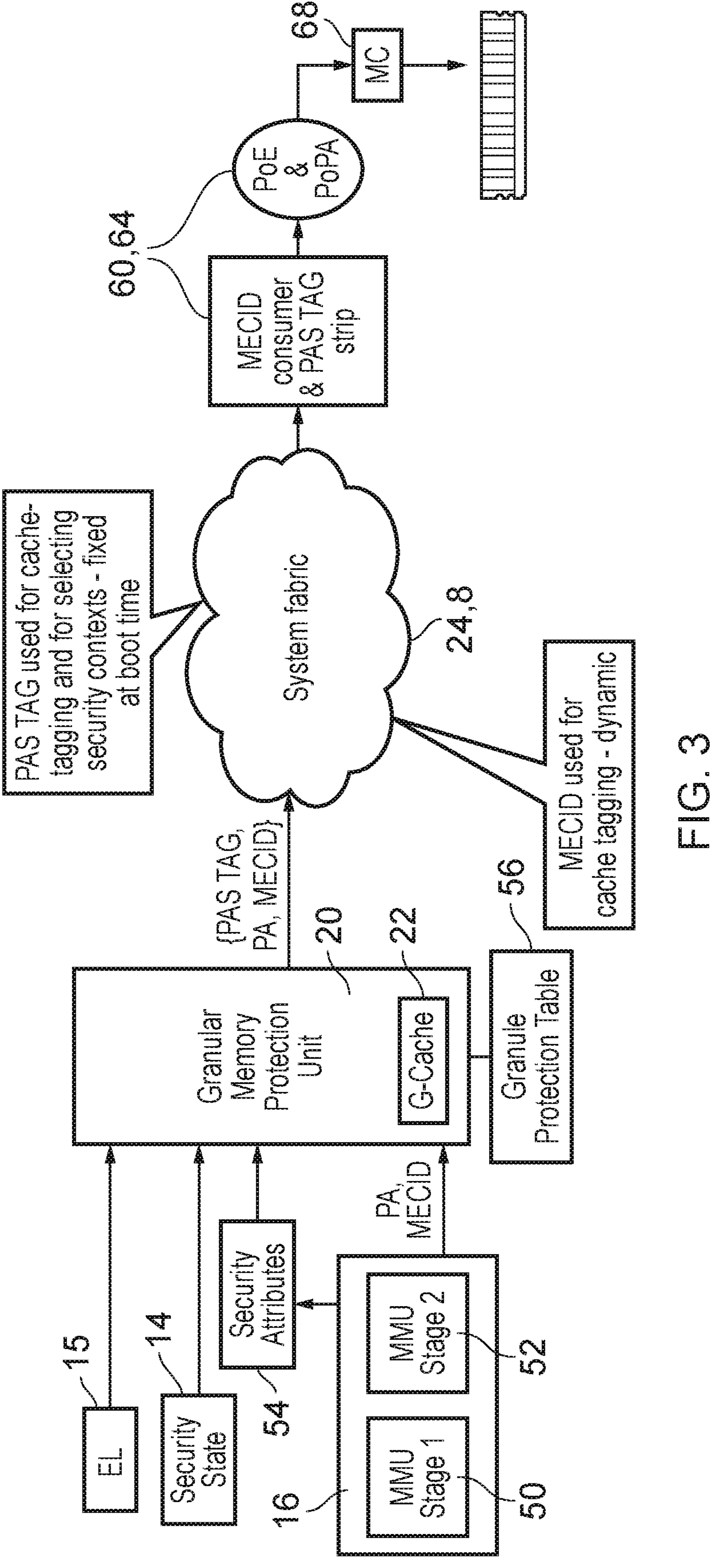
Figure 4:
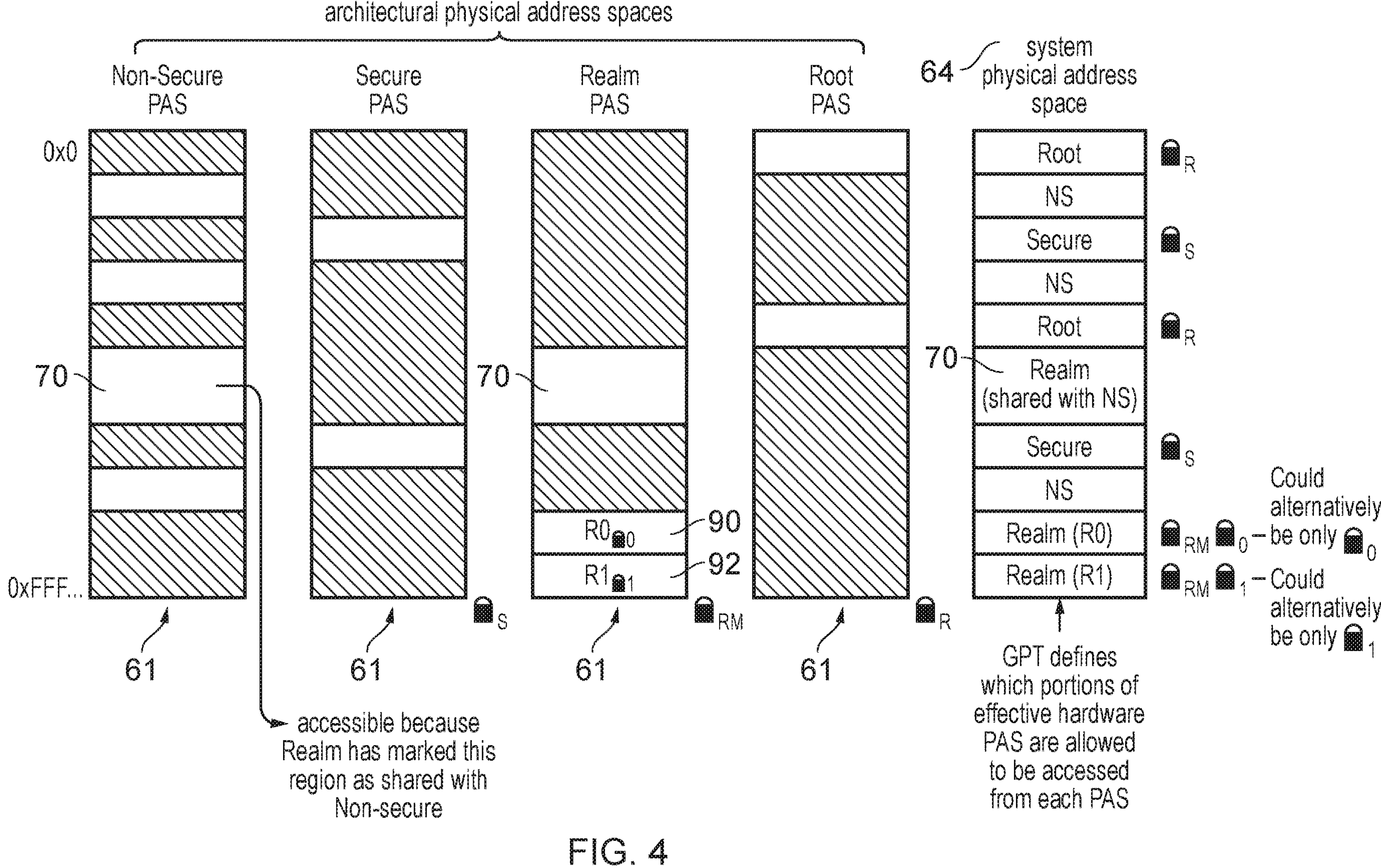
Figure 5:
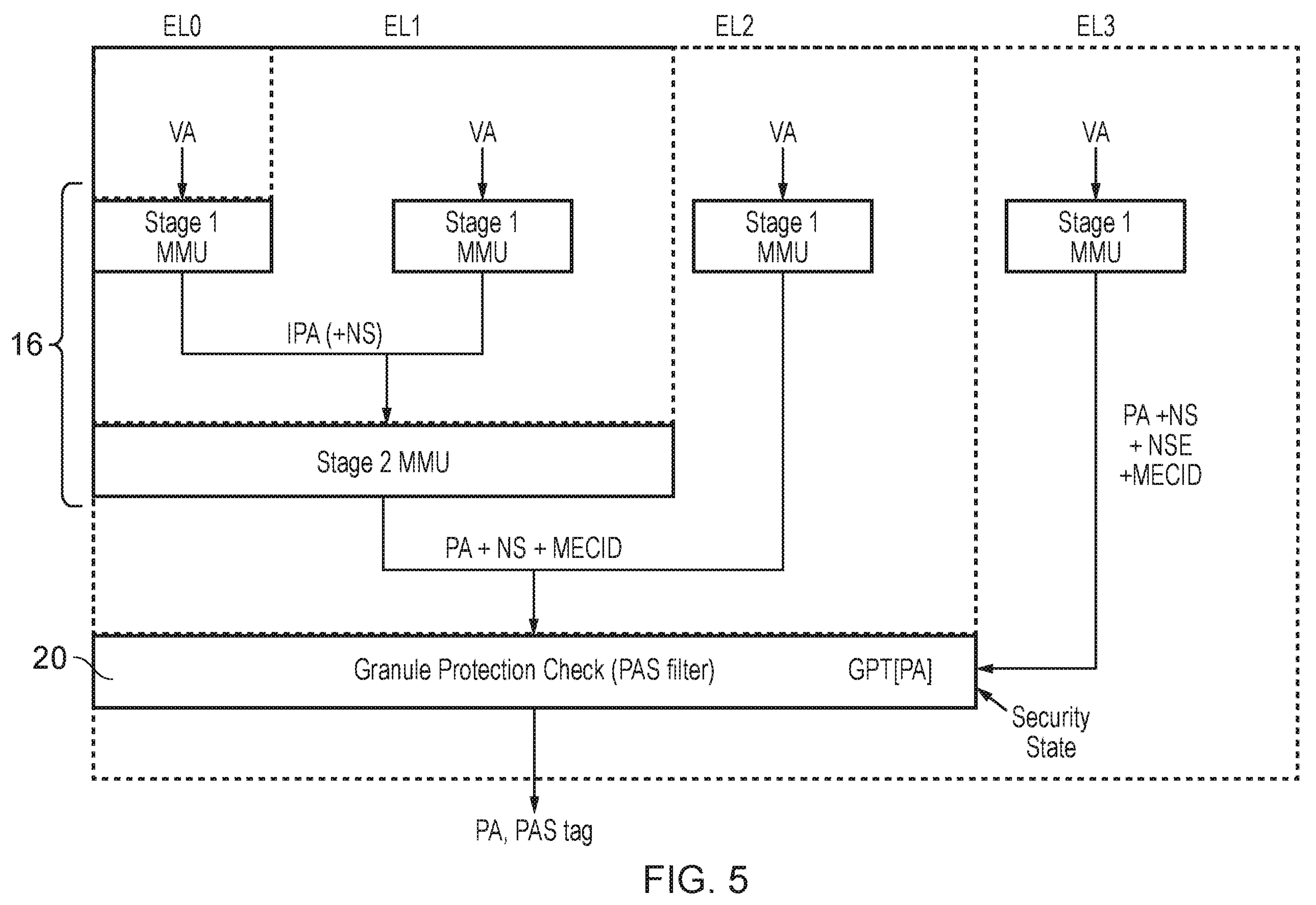
Figure 6:
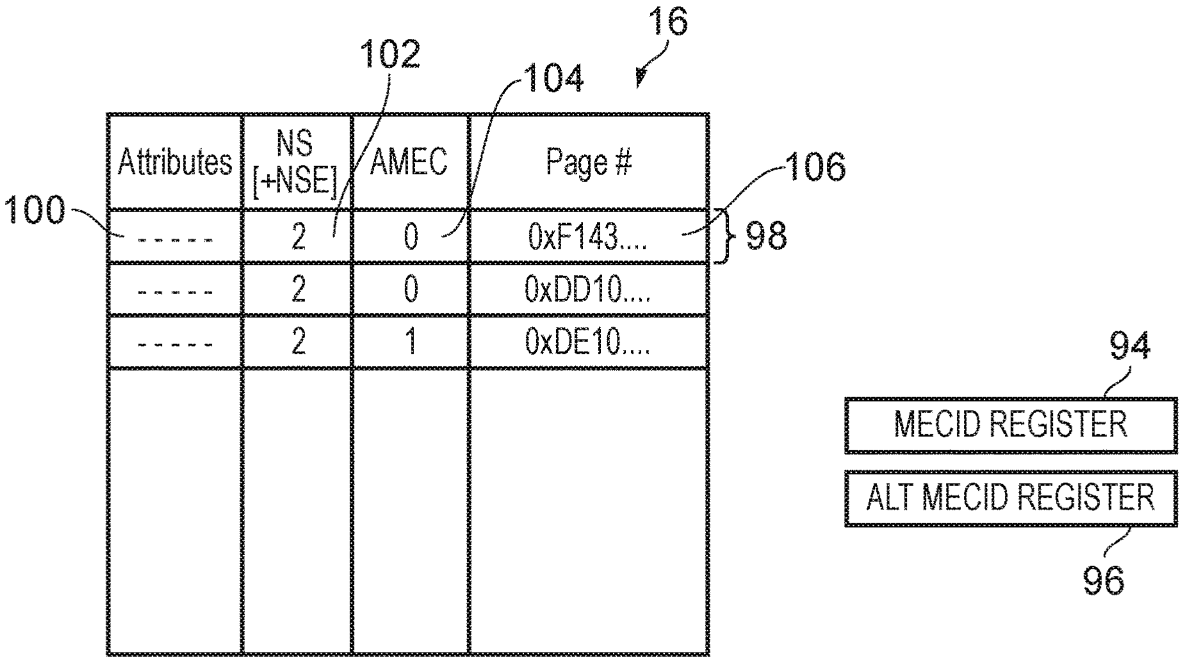
Figure 7:
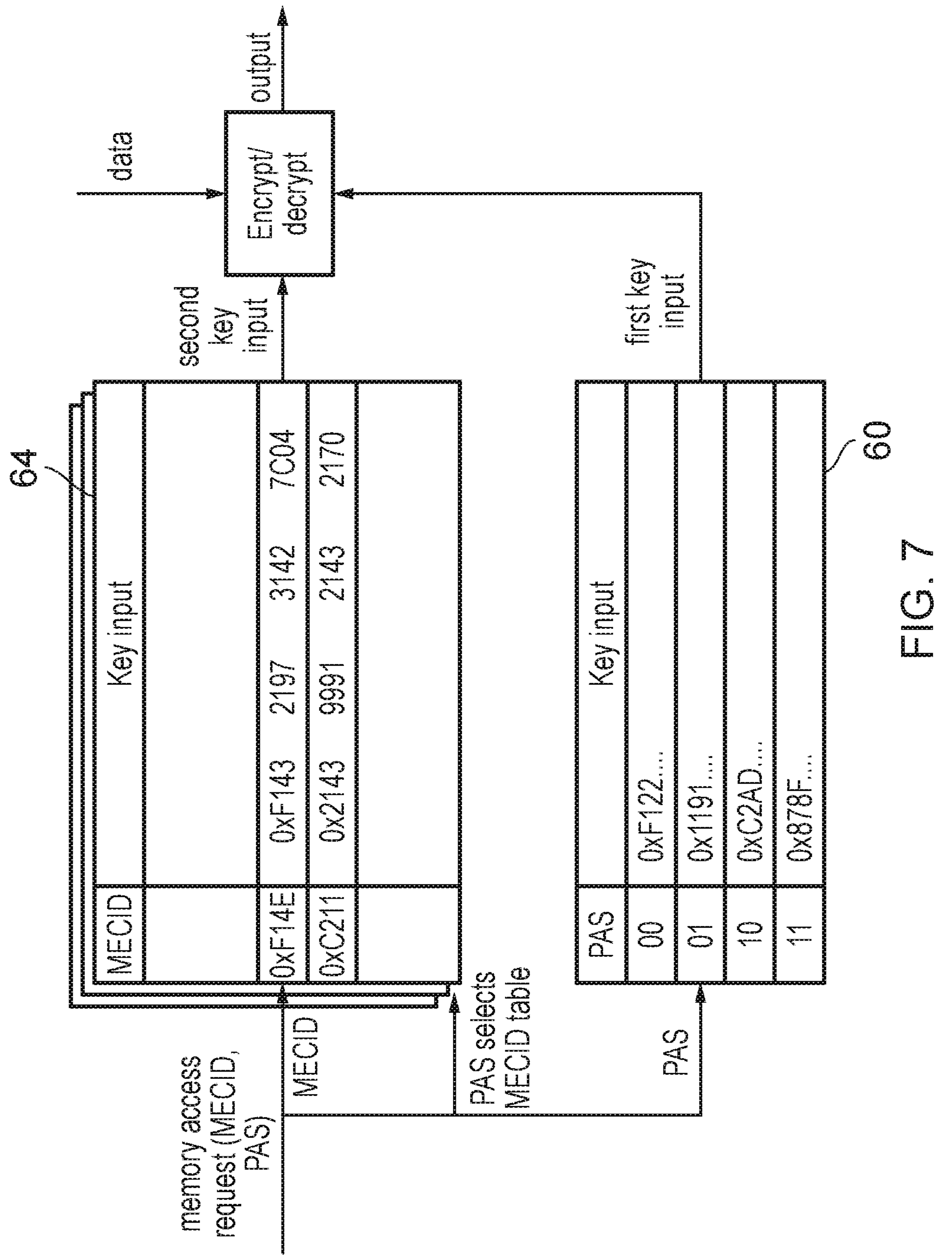
Figure 8:
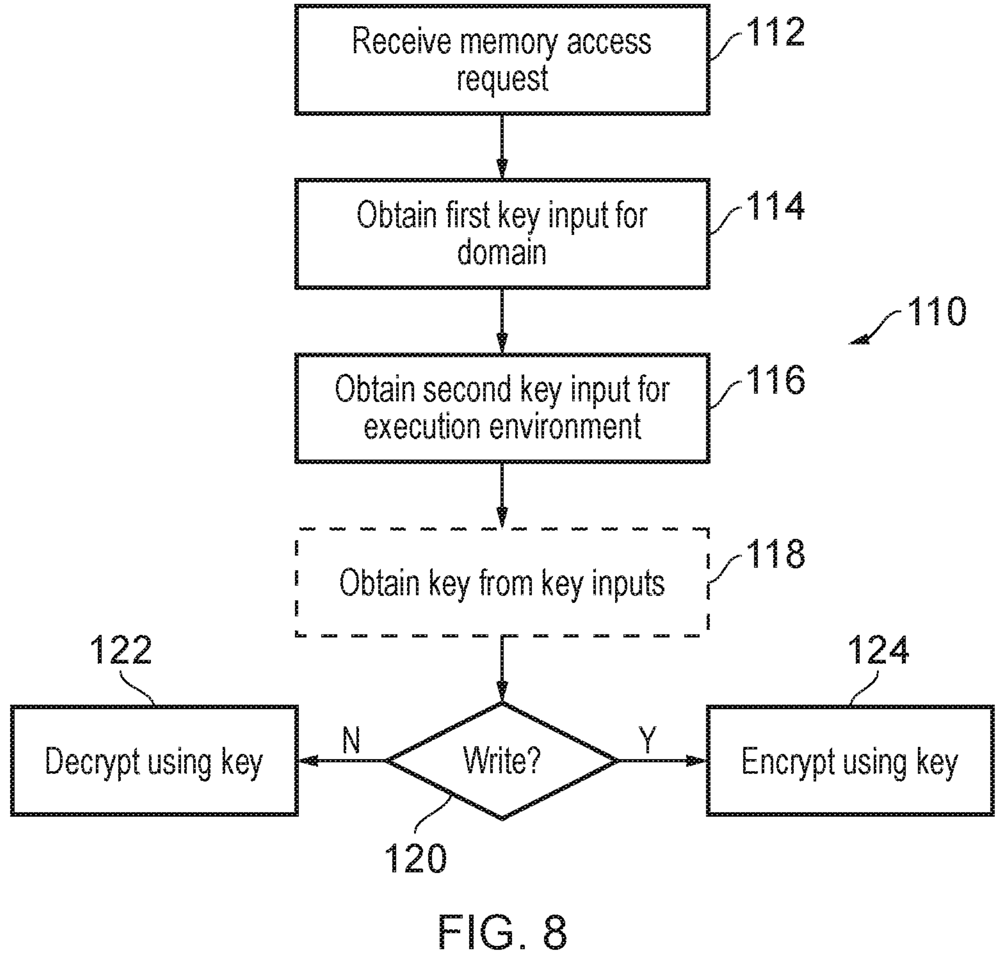
Figure 9:
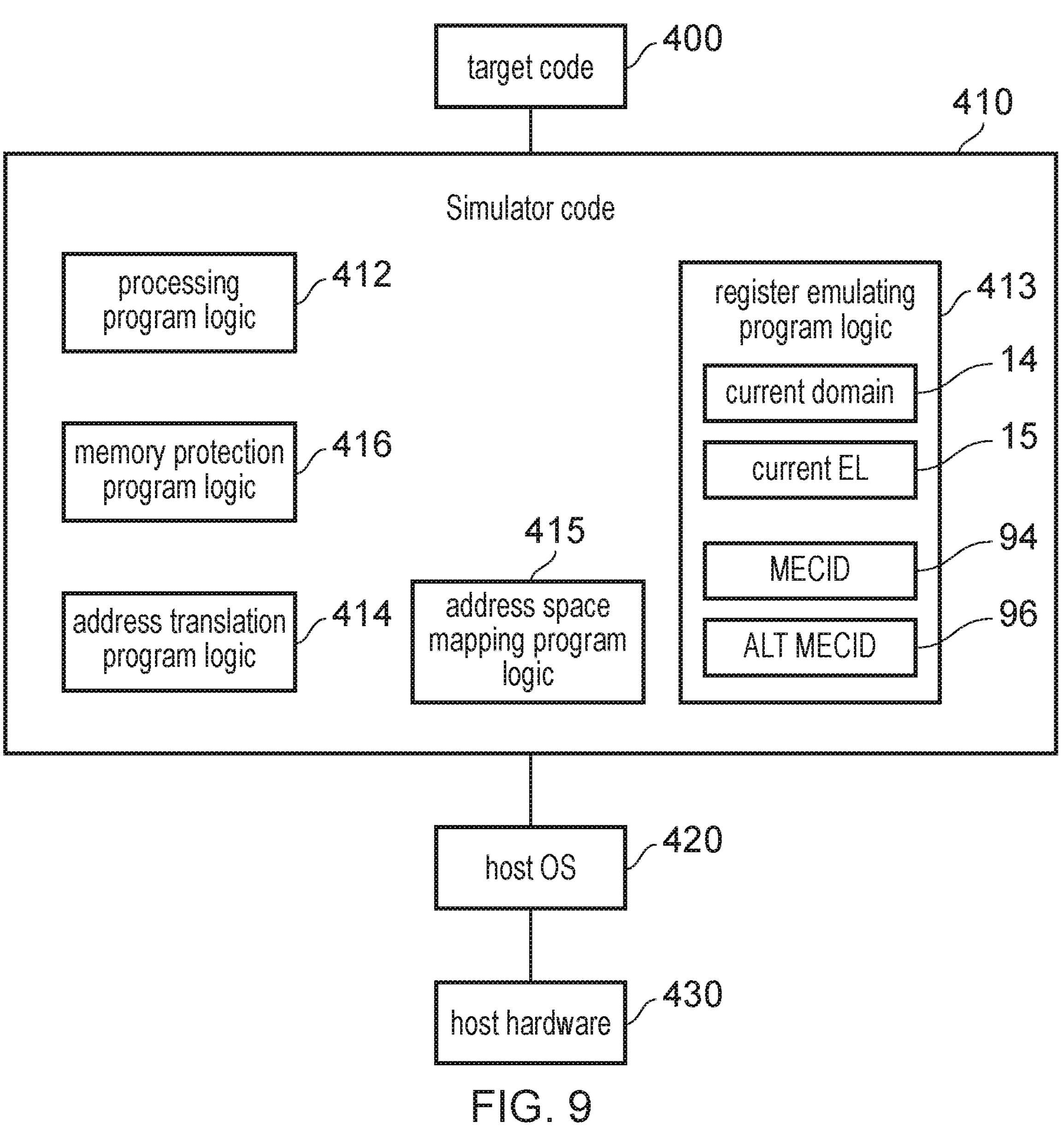
Figure 10:
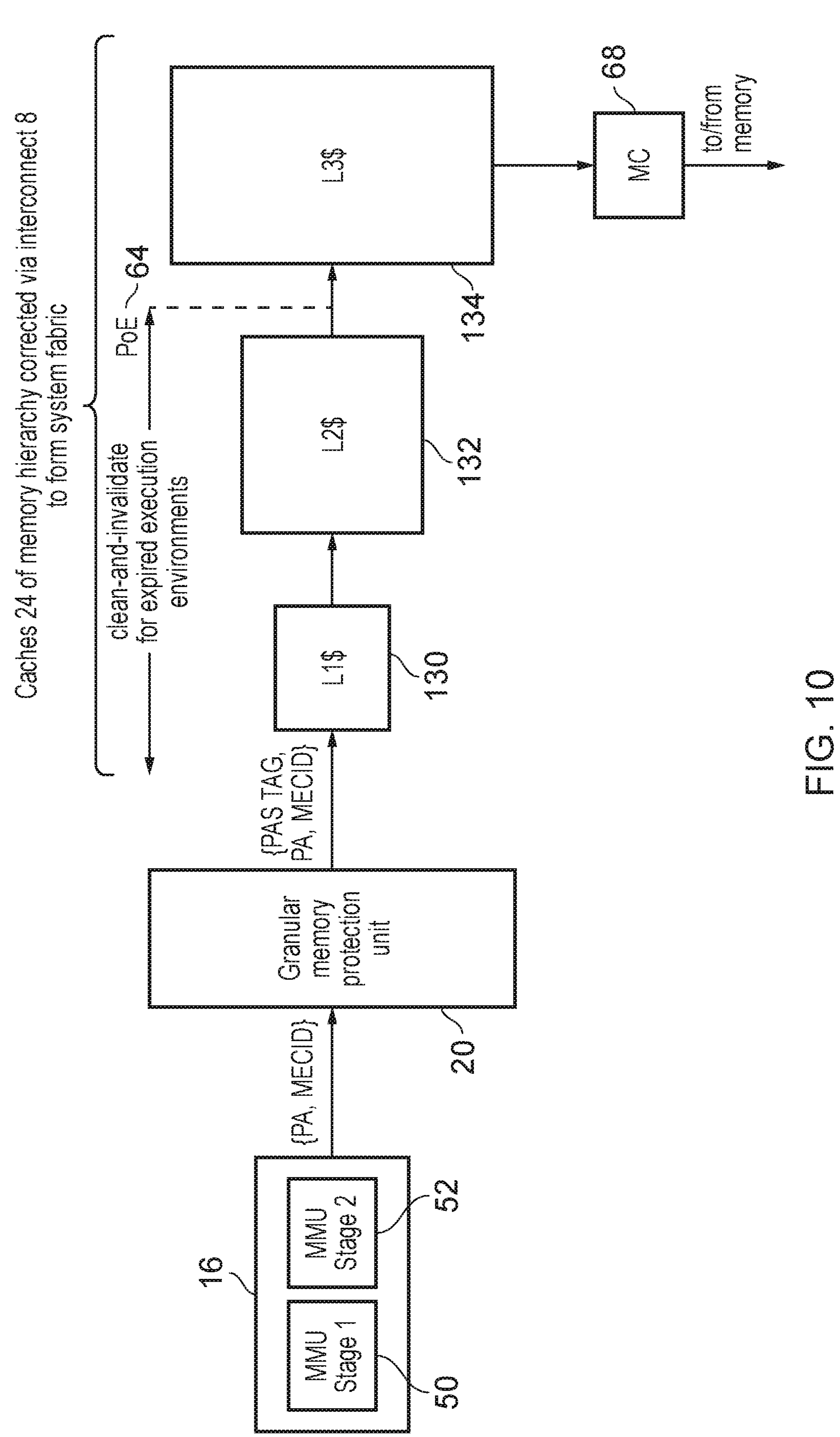
Figure 11:
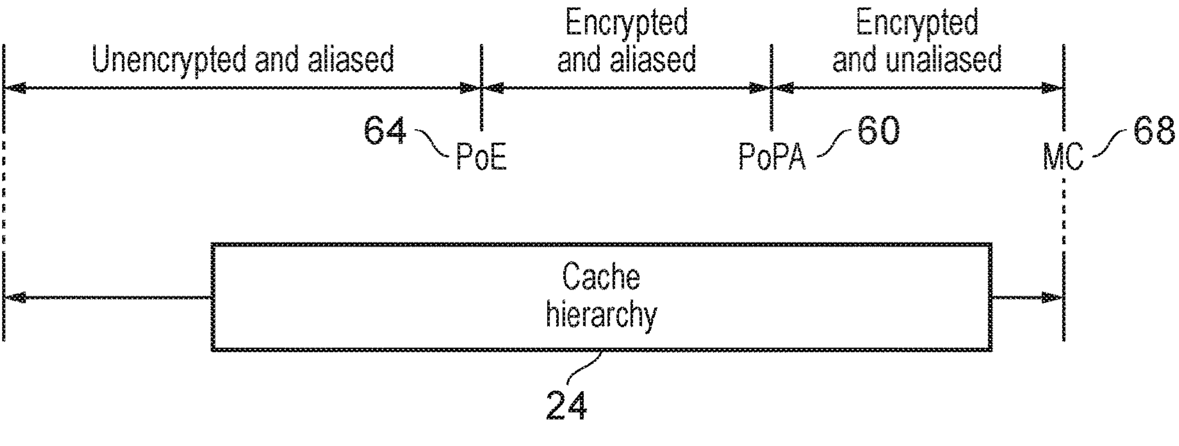
Figure 12:
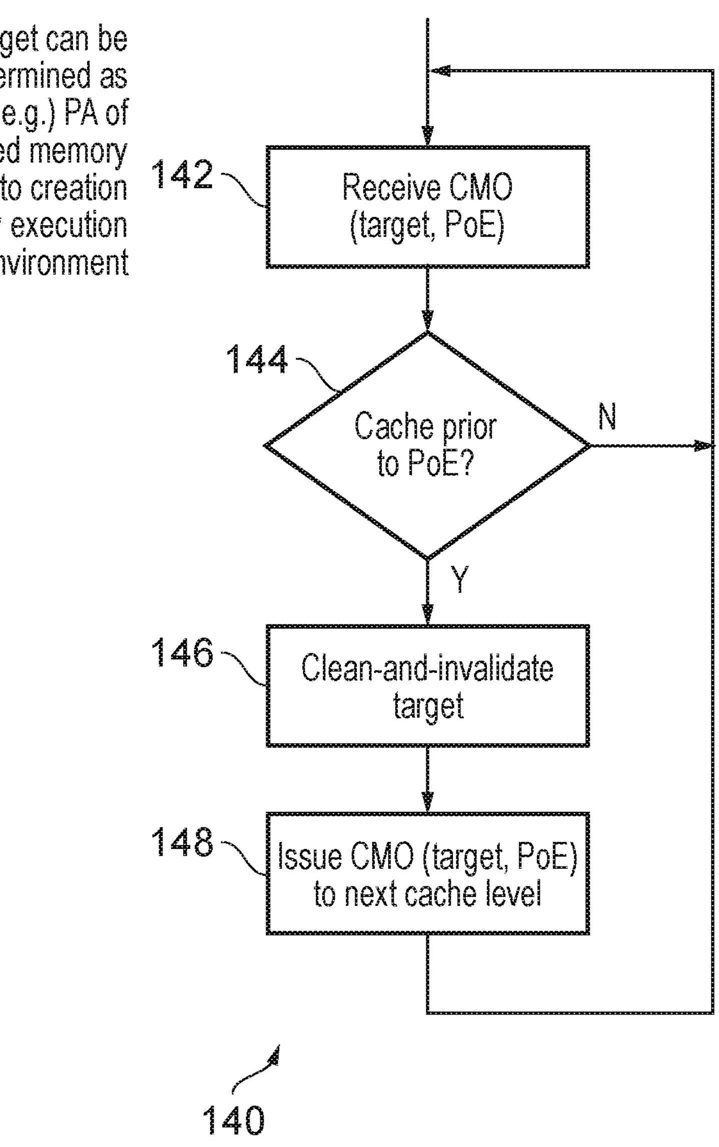
Figure 13A:
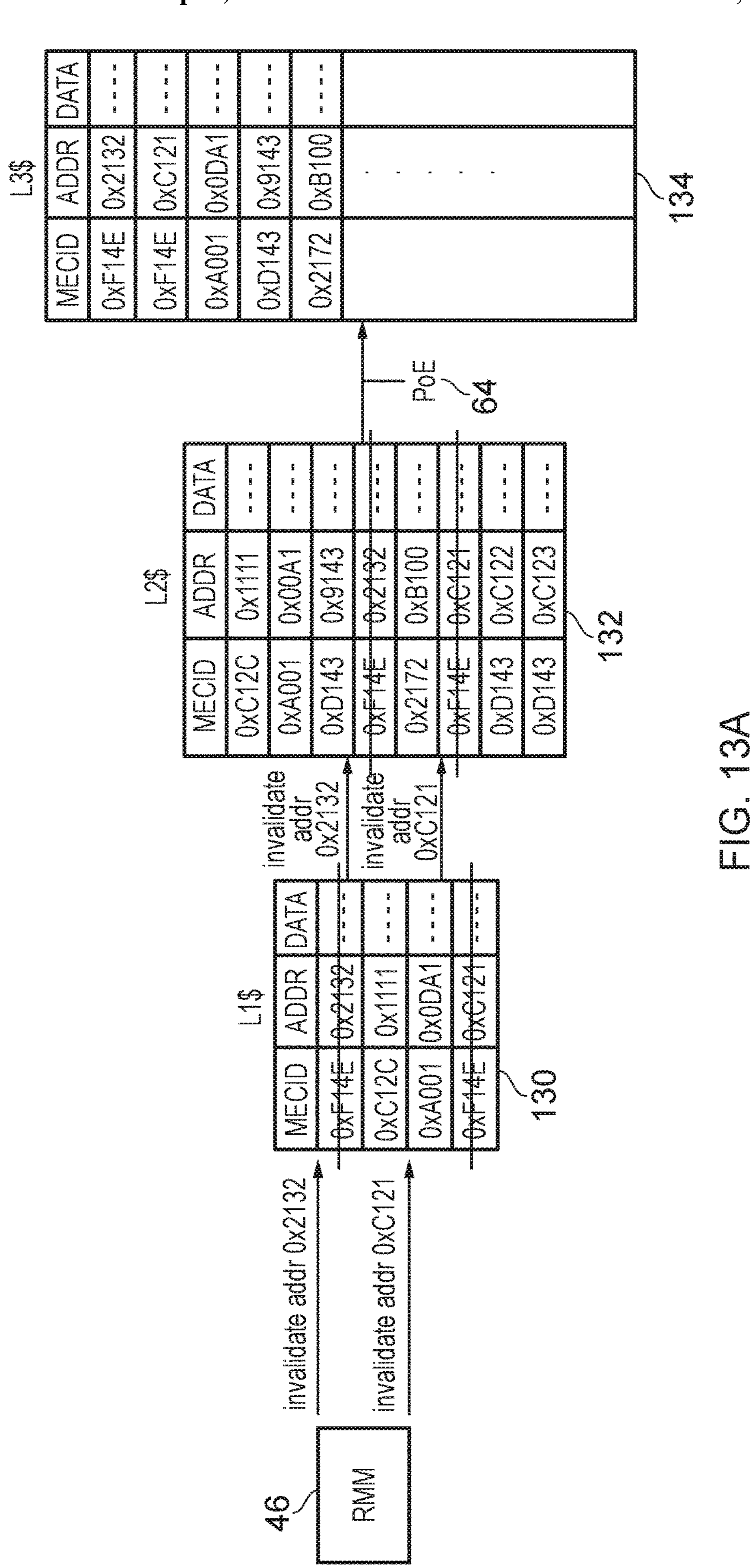
Figure 13B:
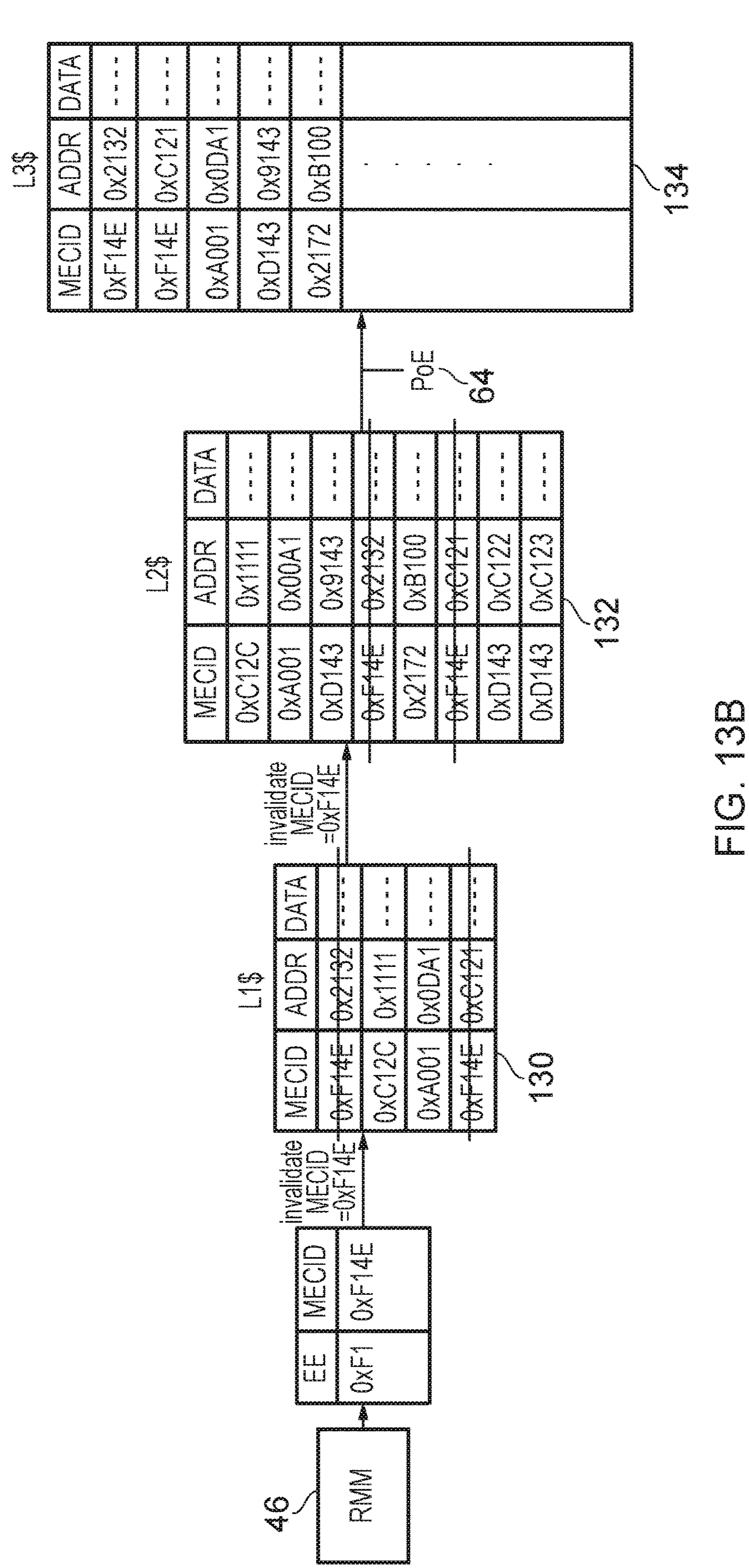
Figure 14:
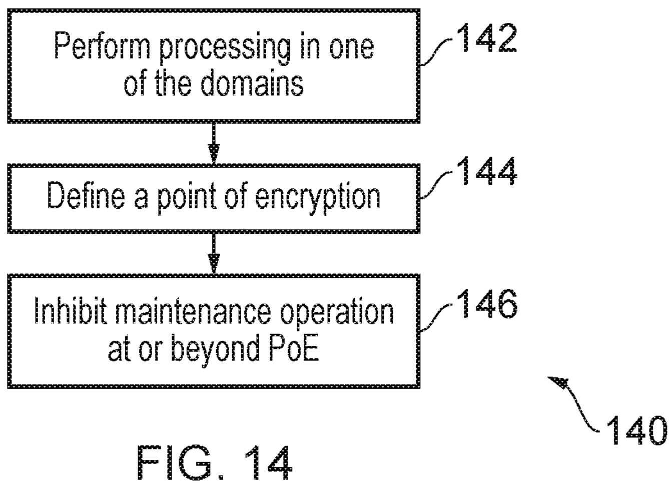
Figure 15:
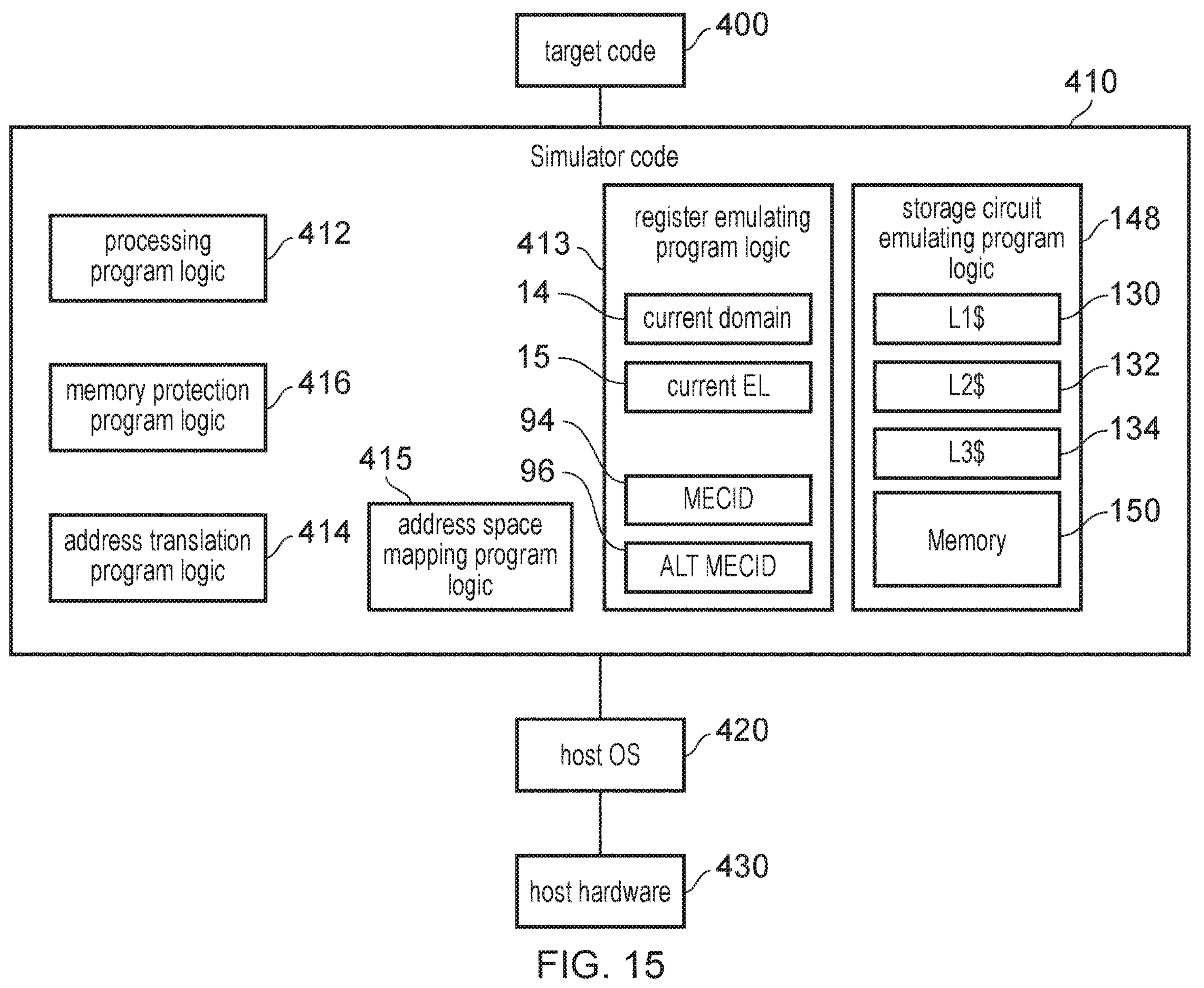
Figure 16:
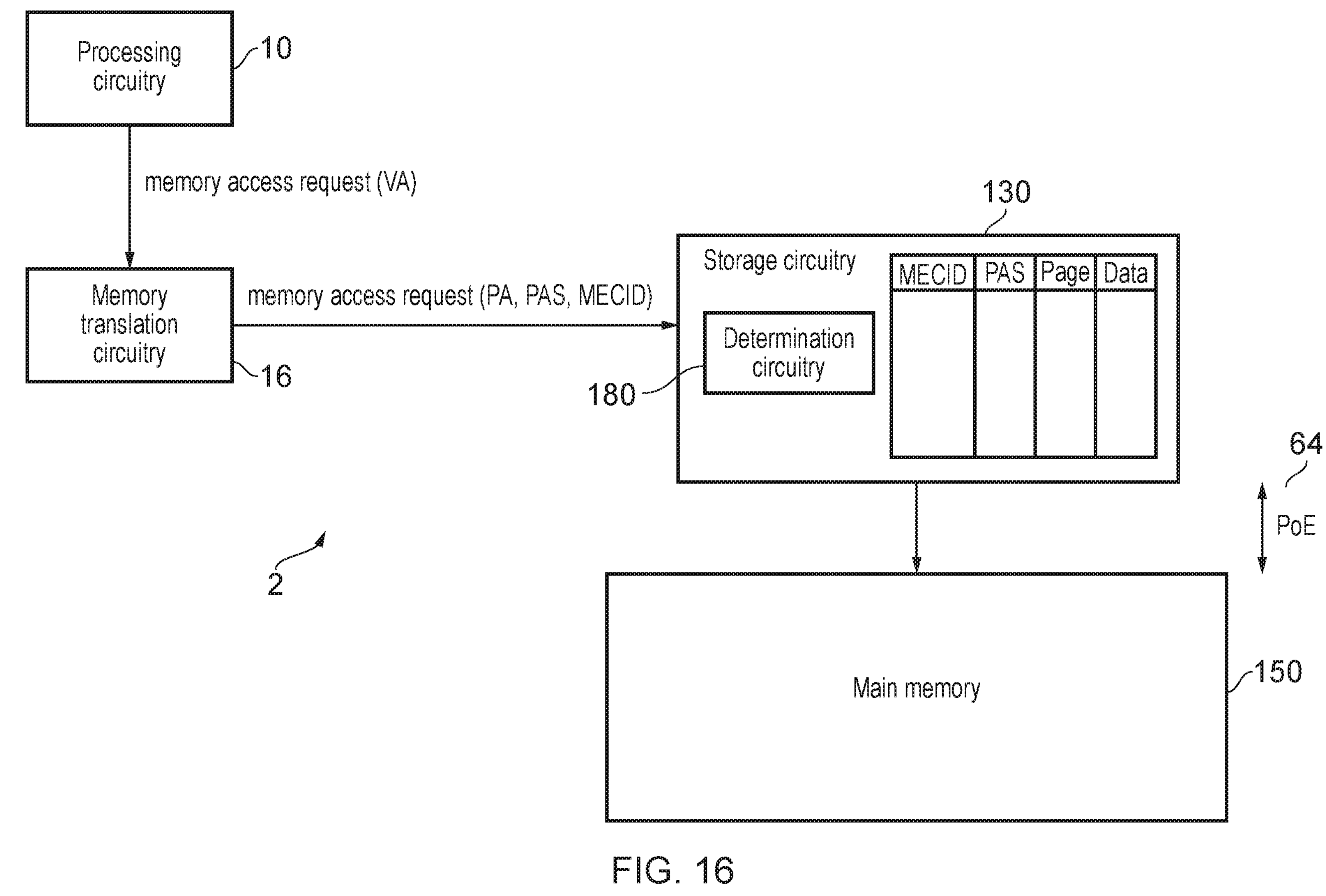
Figure 17:
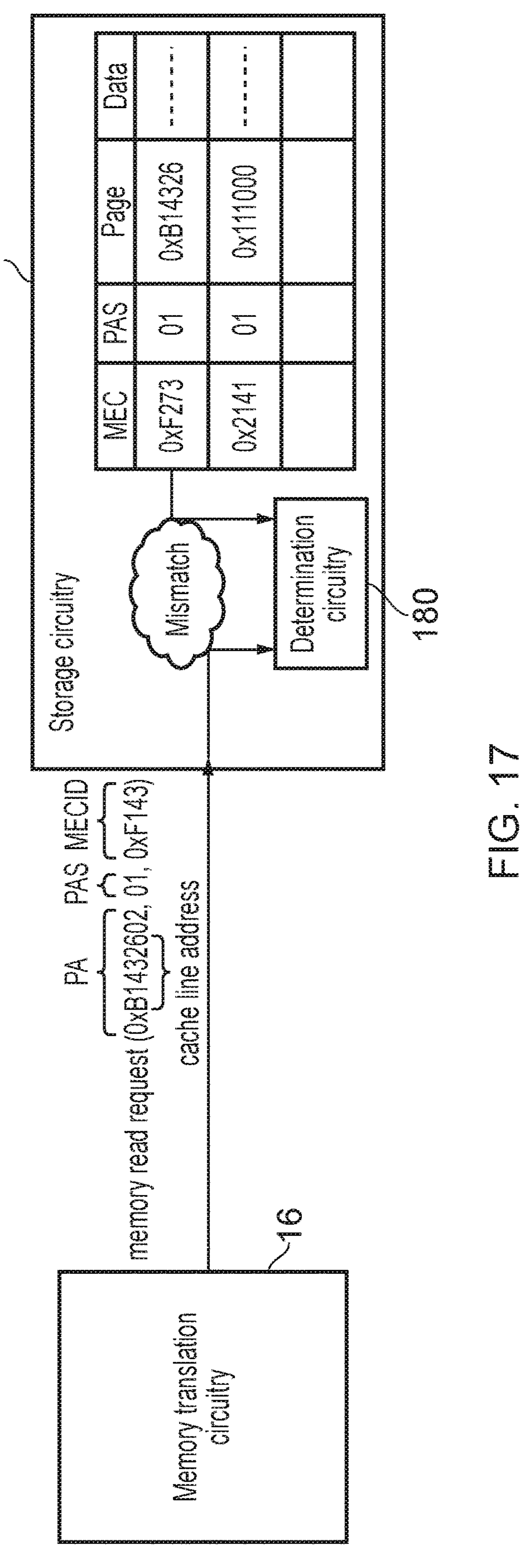
Figure 18:
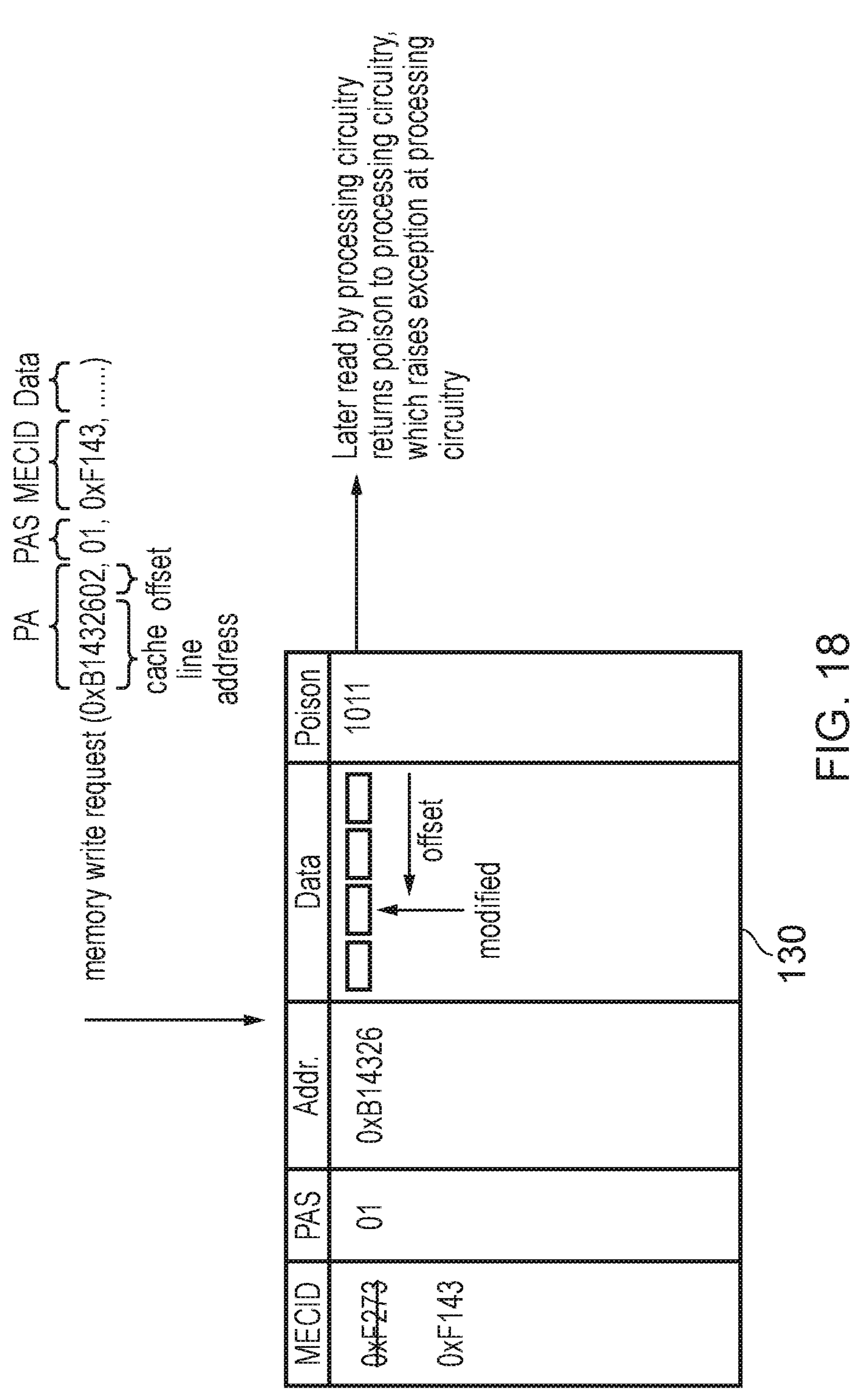
Figure 19:
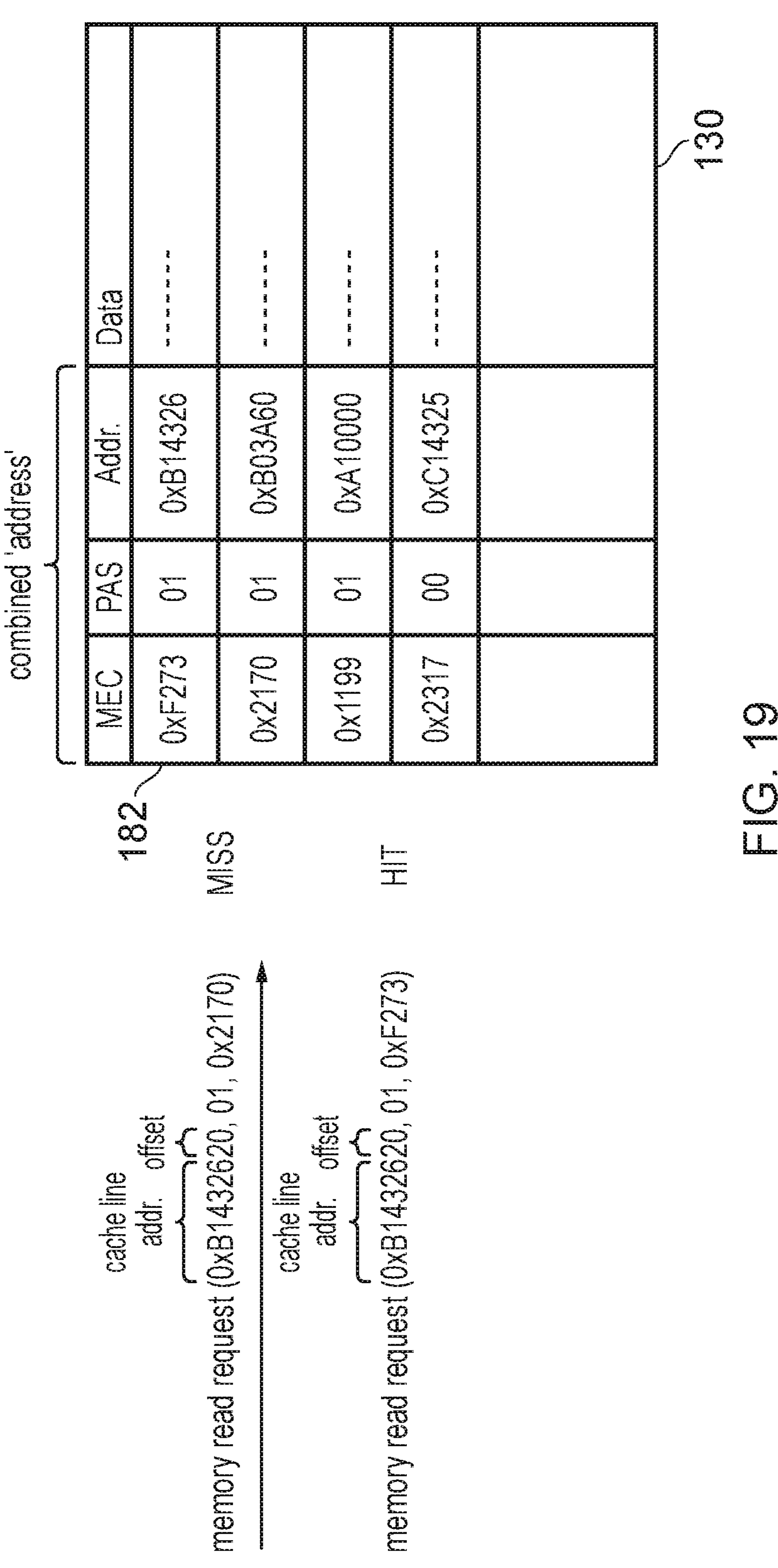
Figure 20:
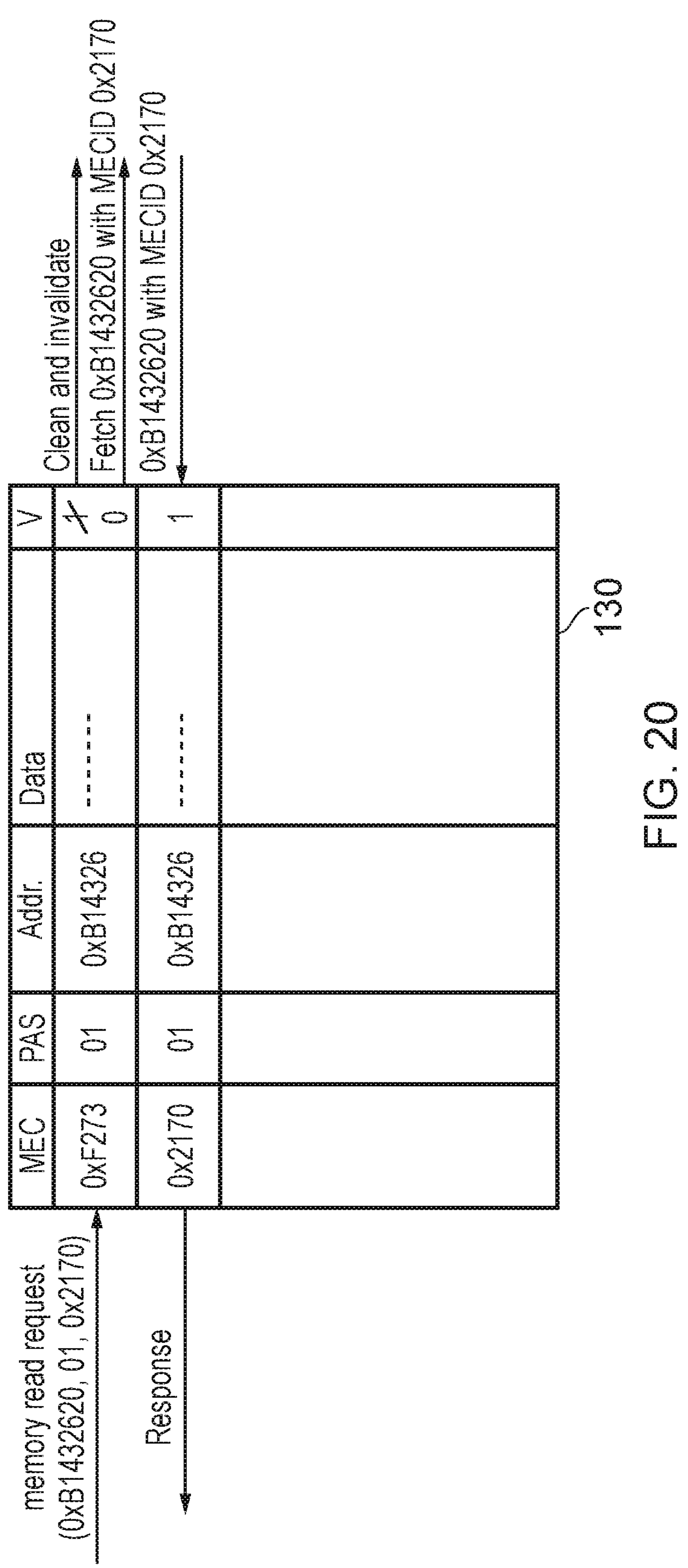
Figure 21:
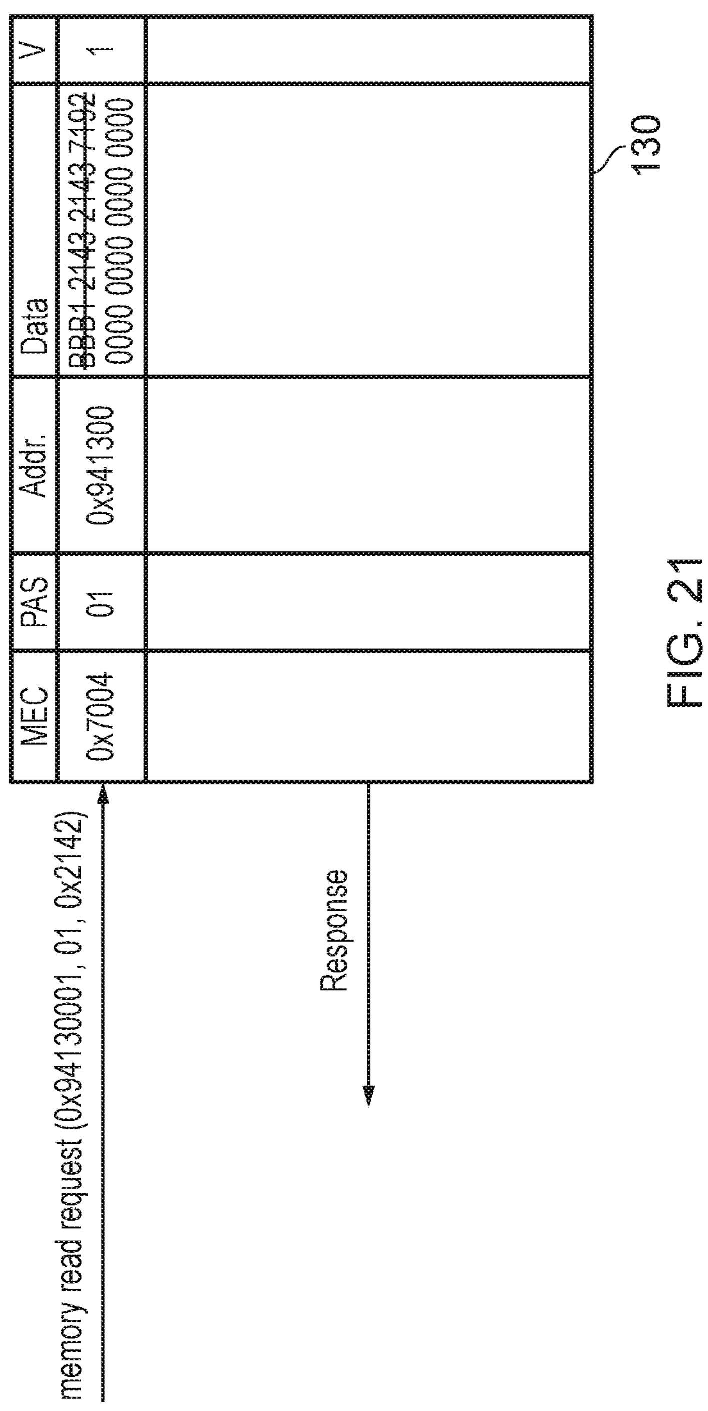
Figure 22:
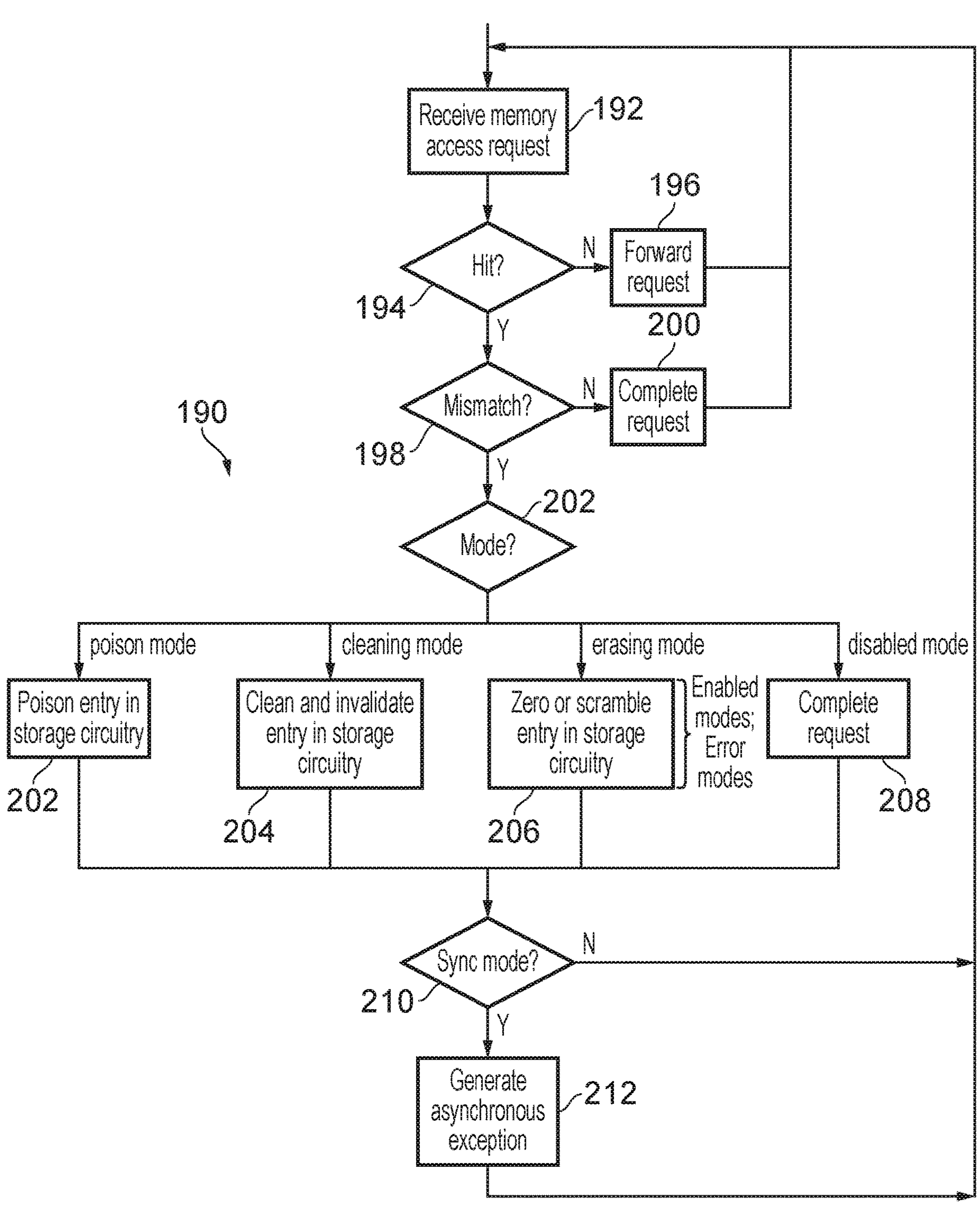
Figure 23:
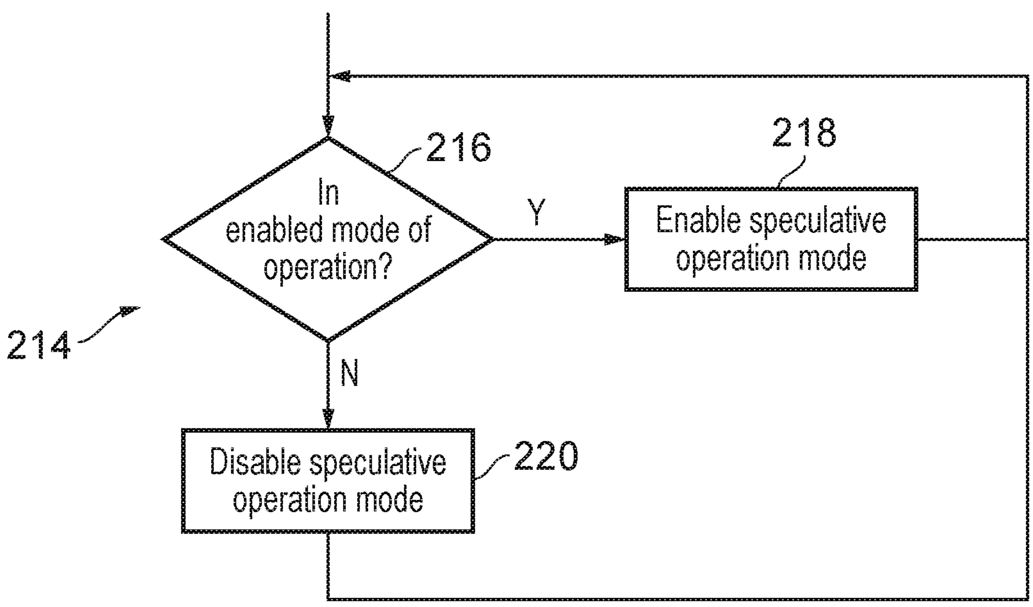
Figure 24:
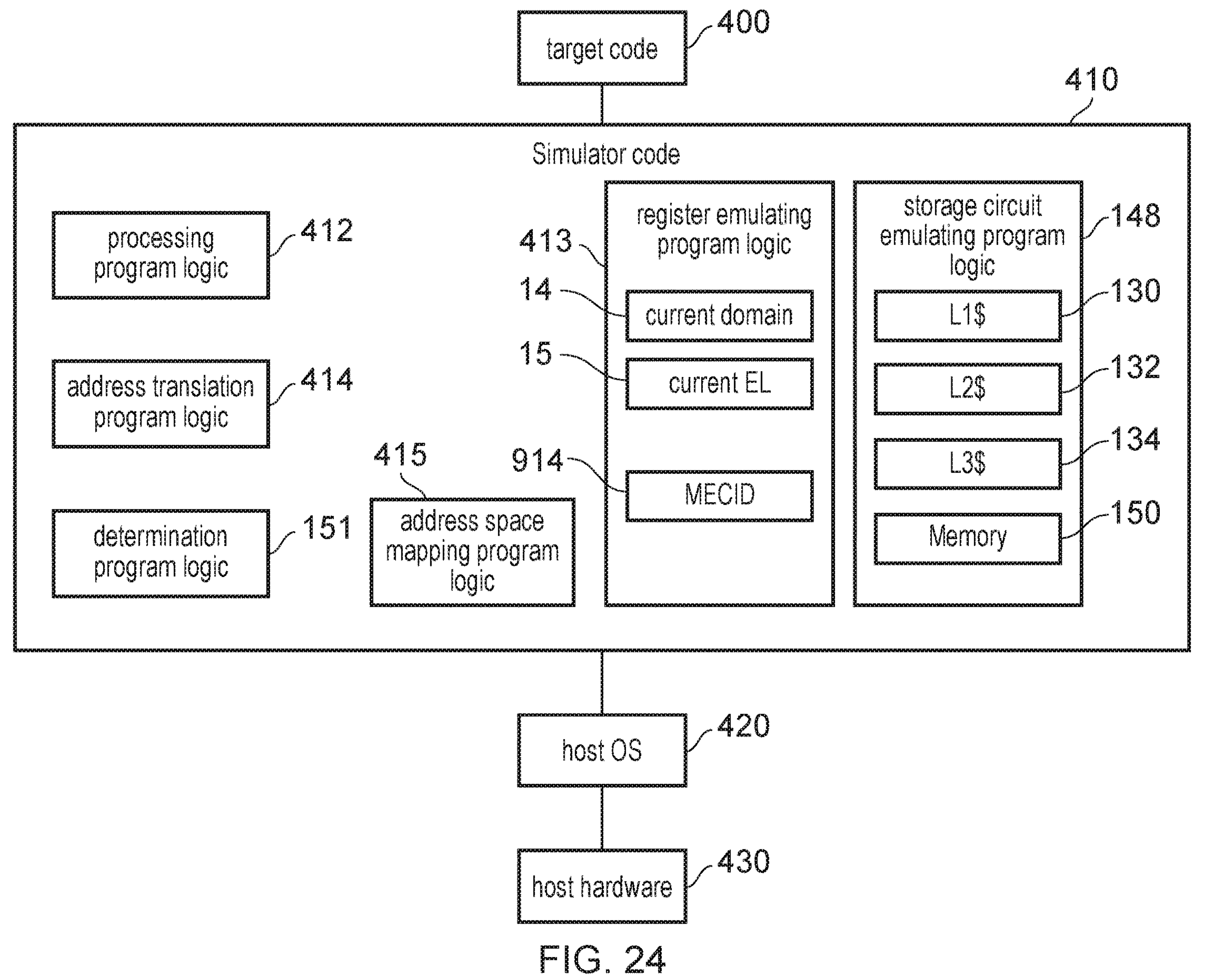

FIG. 3 schematically illustrates another example of a processing system;

FIG. 4 illustrates how a system physical address space can be divided, using a granule protection table;

FIG. 5 summarises the operation of the address translation circuitry and PAS filter;

FIG. 6 shows an example page table entry;

FIG. 7 illustrates an example of the MECID consumer operating together with a PAS TAG stripper to act as memory protection circuitry;

FIG. 8 illustrates a flowchart in accordance with some of the above examples;

FIG. 9 illustrates a simulator implementation that may be used;

FIG. 10 illustrates the location of the Point of Encryption and the extent to which clean-and-invalidate operations extend within the system;

FIG. 11 shows the relationship between the cache hierarchy, the PoE and the PoPA;

FIG. 12 shows a flowchart that illustrates the behaviour of the cache maintenance in more detail;

FIG. 13A illustrates one example of the targeting of the cache maintenance operation;

FIG. 13B illustrates another example of the targeting of the cache maintenance operation;

FIG. 14 illustrates a method of data processing in accordance with some examples;

FIG. 15 illustrates a simulator implementation that may be used;

FIG. 16 illustrates an example system in accordance with some examples;

FIG. 17 illustrates an example of a MECID mismatch;

FIG. 18 illustrates a poison mode of operation that causes, in response to the mismatch, the relevant cache line to be poisoned;

FIG. 19 shows an example implementation in which an aliasing mode of operation is shown;

FIG. 20 illustrates an example of a cleaning mode of operation;

FIG. 21 illustrates an example of an erasing mode of operation;

FIG. 22 illustrates, in the form of a flowchart, an example of how mismatches are handled in the different modes of operation;

FIG. 23 illustrates the interaction between the enabled mode and speculative execution in the form of a flowchart; and FIG. 24 illustrates a simulator implementation that may be used.

Before discussing the embodiments with reference to the accompanying figures, the following description of embodiments and associated advantages is provided.

In accordance with one example configuration there is provided an apparatus comprising: processing circuitry configured to perform processing in one of a fixed number of at least two domains, one of the domains being subdivided into a variable number of execution environments; and memory protection circuitry configured to use a key input to perform encryption or decryption on the data of a memory access request issued to a memory address from within a current one of the domains, wherein the key input is different for each of the domains and for each of the execution environments; the key input for each of the domains is fixed at boot time of the apparatus; and the key input for each of the execution environments is dynamic.

Of the at least two domains, at least one of those domains (there could be several) is subdivided such that a number of execution environments operate within that domain. The memory access request is a read or write request for data stored in memory in a memory hierarchy. The data could be additionally cached within the memory hierarchy. However, the data is ultimately stored in memory (e.g. DRAM). A key input is used to perform encryption or decryption of the data into or out of the memory. A key input can be considered input(s) or parameter(s) into an encryption or decryption algorithm, which is/are kept secret in order to protect the confidentiality of encrypted data. This includes keys themselves, as well as parts of keys, tweakable bits, and so on. The key input differs for each of the fixed number of domains. Furthermore, within the at least one subdivided domain, the key input is different for each execution environment. Consequently, the data that is encrypted by one execution environment cannot be accessed within another execution environment within the subdivided domain unless both of those execution environments have a same key. This makes it possible for data to be kept confidential between the execution environments. Note that the form of the key input could be different between domains as compared to between the execution environments. For instance, each domain might use a different key whereas each execution environment might use the same key but use a different tweakable bit. The key input for each of the domains is selected when the apparatus is first activated, e.g. during a boot sequence. In contrast, the key input for each of the execution environments is dynamic such that it can be changed during operation of the apparatus. Indeed, the number of execution environments is variable and as new execution environments are added and old execution environments are terminated, key inputs can be created and deleted as necessary. The at least two domains include the subdivided realm and a root realm. In some cases, there are at least three domains that include one of a secure realm or a less secure realm (described in more detail below).

In some examples, the apparatus comprises: memory translation circuitry configured to translate the memory address from a virtual memory address to a physical memory address and to provide an encryption environment identifier used to generate the key input; and the memory access request is forwarded from the memory translation circuitry to the memory protection circuitry with the encryption environment identifier. Memory translation circuitry could take the form, for example, of a Memory Management Unit (MMU). As well as providing a translation from a virtual address into a physical address (which could be an intermediate physical address), an encryption environment identifier associated with the physical address is provided. This encryption environment identifier is ultimately used to generate the key input, which is used to perform the encryption (in the case of write memory accesses) or decryption (in the case of read memory accesses). Having determined the encryption environment identifier, this is provided to the memory protection circuitry together with the access request. The use of encryption environment identifiers means that an entire key input (such as an entire key) need not be provided. Instead, a smaller encryption environment identifier can be used instead thereby reducing the system overheads in bus and cache line width expansion, required to carry the identifier.

In some examples, the memory translation circuitry is configured to store a plurality of page table entries, and to indicate the encryption environment identifier in response to performing a lookup on the virtual memory address on the plurality of page table entries. Each page table entry therefore contains an indication of the encryption environment identifier used to perform encryption for that particular page of memory. The indication could be the encryption environment identifier itself or it could be, for instance, an indication as to which of several encryption environment identifiers should be used for encryption and/or decryption for data stored on the page. The page table entries could also contain access permissions that indicate which domains and/or execution environments can access a memory address.

In some examples, the memory translation circuitry comprises a plurality of encryption environment identifier registers; and the memory translation circuitry is configured to indicate which of the environment identifier registers is to be used to provide the encryption environment identifier. A different encryption environment identifier is stored in each of the plurality of encryption environment identifier registers. The indicator stored in each page table entry then indicates which value in the registers is to be provided. As a consequence of this, the number of additional bits required in the page table entries is kept small—thereby reducing the amount of storage required. By providing multiple registers, it is possible to allow an execution environment to simultaneously use two or more different encryption environment identifiers—each of the identifiers being used to access data in a different location. For instance, an execution environment might use one encryption environment identifier to access its own private data, and might use a second encryption environment identifier to access data that is shared with a second execution environment. The second execution environment could have a third encryption environment identifier to access its own private data, or the second encryption environment identifier could be the only encryption environment identifier used by the second execution environment, for instance. More complex sharing schemes are also of course possible.

In some examples, the encryption environment identifier is shared between a subset of the execution environments. By sharing the encryption environment identifier, multiple execution environments that share the encryption environment identifier can each access a same area of memory and thereby share data between the execution environments, which is not accessible to other execution environments without the encryption environment identifier.

In some examples, the memory protection circuitry is configured to obtain the key input for the one of the execution environments by performing a lookup using the encryption environment identifier provided by the memory access request. The memory protection circuitry can therefore either contain a table or otherwise access a table using the encryption environment identifier and thereby obtain the key input corresponding to that encryption environment identifier.

In some examples, a result of the lookup is the key input in a form of a key. The lookup could thereby provide a key from the result of the lookup. In some examples, the lookup is performed specifically for key inputs associated with execution environments rather than for key inputs associated with the domains.

In some examples, a result of the lookup is the key input in the form of a contribution used to perform the encryption or decryption. As previously described, the key input could be a (secret) contribution to performing the encryption or decryption such as a tweak value or a part of a key. In some examples, the lookup is performed specifically for key inputs associated with execution environments rather than for key inputs associated with the domains.

In some examples, the memory address to which the memory access request is issued is a physical memory address in one of a plurality of physical address spaces; and each of the physical address spaces is associated with one of the at least two domains. Depending on the permissions that are provided in the underlying architecture, domains might be able to access (perhaps in a limited manner) the data stored in non-associated domains.

In some examples, the memory address to which the memory access request is issued is a physical memory address in one of a plurality of physical address spaces; and each of the physical address spaces is associated with exactly one of the at least two domains.

In some examples, the at least two domains include a root domain for managing switching between the at least two domains; and the plurality of physical address spaces include a root physical address space associated with the root domain, separate from physical address spaces associated with the plurality of other domains. By providing a dedicated root domain for controlling the switching, this can help to maintain security by limiting the extent to which code executing in one domain can trigger a switch to another domain. For example the root domain may perform various security checks when a switch of domain is requested. Rather than using one of the physical address spaces associated with one of the other domains, the root domain has its own physical address space allocated to it. By providing a dedicated root physical address space isolated from physical address spaces associated with the other domains, this can provide a stronger guarantee of security for the data or code associated with the root domain, which may be regarded as the most critical for security given that it will manage entry into other domains. Also, the provision of a dedicated root physical address space distinguished from the physical address spaces of other domains can simplify system development because it may simplify allocation of physical addresses within the respective physical address spaces to particular units of hardware memory storage. For example, by identifying a separate root physical address space it can be simpler for the data or program code associated with the root domain to be preferentially stored in a protected memory on-chip rather than in a less secure off-chip memory, with less overhead in determining the portions associated with the root domain than if the root domain's code or data was stored in a common address space shared with another domain.

In some examples, the at least two domains comprise at least: a secure domain associated with a secure physical address space, and a less secure domain associated with a less secure physical address space; the less secure physical address space is accessible from the less secure domain, the secure domain and the root domain; and the secure physical address space is accessible from the secure domain and the root domain and is inaccessible from the less secure domain. Hence, this allows code executing in the secure domain to have its code or data protected from access by code operating in the less secure domain with stronger security guarantees than if page tables were used as the sole security controlling mechanism. For example, portions of code which require stronger security can be executed in the secure domain managed by a trusted operating system distinct from a non-secure operating system operating in the less secure domain. An example of a system supporting such secure and less secure domains may be processing systems operating according to a processing architecture which supports the TrustZone® architecture feature provided by Arm® Limited of Cambridge, UK. In conventional TrustZone® implementations the monitor code for managing switching between secure and less secure domains uses the same secure physical address space that is used by the secure domain. In contrast, by providing a root domain for managing switching of other domains and assigning a dedicated root physical address space for use by the root domain as described above, this helps to improve security and simplify system development.

In some examples, all of the plurality of physical address spaces are accessible from the root domain. As the code executing in the root domain has to be trusted by any party providing code operating in one of the other domains, as the root domain code will be responsible for the switching into that particular domain in which that party's code is executing, then inherently the root domain can be trusted to access any of the physical address spaces. Making all of the physical address spaces accessible from the root domain allows to perform functions such as transitioning memory regions into and out of the domain, copying code and data into a domain e.g. during boot, and providing services to that domain. In those sub-examples where a plurality of encryption environment identifier registers are provided, one of the registers can be used to store an encryption environment identifier associated with one of the realms that software executing within the root domain wishes to access. This allows the software within the root domain to encrypt/decrypt data in the realm domain. The root domain does not have a primary MECID for root PAS access. Instead, a default MECID value of 0 is used within the root domain. The root domain uses the alternative MECID register 96 to store an alternate MECID for its access to the realm PAS.

In some examples, the one of the domains is a realm domain associated with a realm physical address space; and the realm physical address space is subdivided into the variable number of sub-area physical address spaces. Each realm can therefore be given its own physical address space within the overall realm address space.

In some examples, the less secure physical address space is accessible from the realm domain; and the realm physical address space is accessible from the realm domain and the root domain and is inaccessible from the less secure domain. Hence, the realm domain may be considered to be more secure than the less secure domain but similarly secure to the secure domain.

In some of these examples, the secure domain may be accessible from the realm domain. However, in other examples, the realm physical address space is inaccessible from the secure domain; and the secure physical address space is inaccessible from the realm domain. Increasingly there is a desire for a software provider to be provided with a secure computing environment, which limits the need to trust other software providers associated with other software executing on the same hardware platform. For example, there may be a number of uses in fields such as mobile payment and banking, enforcement of anti-cheating or piracy mechanisms in computer gaming, security enhancements for operating system platforms, secure virtual machine hosting in a cloud system, confidential computing, etc., where a party providing software code may not be willing to trust the party providing an operating system or hypervisor (components which might previously have been considered trusted). In a system supporting secure and less secure domains with respective physical address spaces, such as systems based on the TrustZone® architecture described above, with the increasing take-up of secure components operating in a secure domain, the set of software typically operating in the secure domain has grown to include a number of pieces of software which may be provided from a different number of software providers, including parties such as an original equipment manufacturer (OEM) who assembles a processing device (such as a mobile phone) from components including a silicon integrated circuit chip provided by a particular silicon provider, an operating system vendor (OSV) who provides the operating system running on the device, and a cloud platform operator (or cloud host) who maintains a server farm providing server space for hosting virtual machines on the cloud. Hence, if the domains were implemented in a strict order of increasing privilege, then there may be a problem because an application provider providing application-level code which wishes to be provided with a secure computing environment may not wish to trust a party (such as the OSV, OEM or cloud host) who might traditionally have provided software executing the secure domain, but equally the parties providing the code operating in a secure domain are unlikely to wish to trust application providers to provide code operating at a higher privilege domain which is given access to data associated with less privileged domains. These examples recognise that a strict hierarchy of domains of successively increasing privilege may not be appropriate and therefore the realm domain can be considered to be orthogonal to the secure domain—while the realm domain and the secure domain can each access the less secure physical space, neither realm can access the other's physical space.

In some examples, the less secure physical address space is accessible from all of the at least two domains. This is useful because it facilitates sharing of data or program code between software executing in different domains. If a particular item of data or code is to be accessible in different domains, then it can be allocated to the less secure physical address space so that it can be accessed from any of the domains.

The following description of examples may also be of relevance.

In accordance with one example configuration there is provided an apparatus comprising: processing circuitry configured to perform processing in one of a fixed number of at least two domains, wherein one of the domains is subdivided into a variable number of execution environments one of which is a management execution environment configured to manage the execution environments; and memory protection circuitry defining a point of encryption after at least one unencrypted storage circuit of a memory hierarchy and before at least one encrypted storage circuit of the memory hierarchy, wherein the at least one encrypted storage circuitry is configured to use a key input to perform encryption or decryption on the data of a memory access request issued from within a current one of the domains, wherein the key input is different for each of the domains and for each of the execution environments; and the management execution environment is configured to inhibit issuing a maintenance operation to the at least one encrypted storage circuit of the memory hierarchy.

Processing can occur within a number (two or more, such as three or more) domains or worlds. One of those domains/worlds is subdivided into a number (e.g. a plurality) of execution environments and one of those execution environments is a management execution environment, which is responsible for management of each of the execution environments. The management execution environment takes care of, for instance, cache maintenance operations. Memory protection circuitry is provided, which protects the memory. For instance, it may take care of the isolation of memory used by each of the domains. The memory protection circuitry defines a point of encryption within the memory hierarchy. Memory hierarchy systems (storage circuits) before the point of encryption store data unencrypted whereas memory hierarchy systems (storage circuits) after the point of encryption store data encrypted. The encryption used for these encrypted storage circuits differs for each of the domains and for the execution environments. That is, unless explicitly requested, software executing in one domain or execution environment cannot decipher data belonging to software in another domain or execution environment. This is achieved by using a key input during the encryption process (e.g. a key, a part of a key, or a tweakable bit) that differs for each domain and/or execution environment. At least some of the cache maintenance operations that are issued by the management execution environment are directed to the unencrypted storage circuitry without being directed to the encrypted storage circuitry. This is because, since the data belonging to one domain or execution environment is generally not accessible to another domain or execution environment (except for certain specially defined situations), there may be no need to clean that data up in order to prevent it inadvertently becoming accessible to another domain or execution environment. The number of cache maintenance operations can therefore be limited, thus reducing performance impacts.

In some examples, the management execution environment is configured, in response to a change in a memory assignment made to one of the execution environments, to issue the maintenance operation to the at least one unencrypted storage circuit of the memory hierarchy. Since the unencrypted storage circuit of the memory hierarchy stores the data in an unencrypted format, it is important for the maintenance operation to specifically target these storage circuits. After the point of encryption, it becomes less critical for certain maintenance operations to be performed, since the data generally cannot be accessed by other execution environments (or domains/worlds). The change in memory assignment might occur, for instance, as a consequence of an execution environment terminating or as a new execution environment starting.

In some examples, the maintenance operation is an invalidation operation. An invalidation operation marks the data in a cache as being unusable (e.g. deleted) so that it must be obtained from elsewhere in the memory hierarchy such as the memory. By invalidating up to the point of encryption, the data can no longer be accessed without the decryption process being performed. Hence, if the key input associated with the data has also been erased or lost then the data is no longer accessible. It is important to make sure that any previous execution environment that used that memory space, whose data is stored in an unencrypted manner in the unencrypted storage circuit(s), has its data invalidated so that it cannot be accessed by the new execution environment. This is achieved by using cache maintenance operations to target the unencrypted storage circuit(s). There is no need for the same maintenance operations to target the encrypted storage circuit(s) because the data associated with the old execution environment is encrypted. Since the new execution environment does not have access the old key of the old execution environment, the data cannot be deciphered.

In some examples, the maintenance operation is a clean-and-invalidate operation. A clean-and-invalidate operation causes dirty (modified) data to be written further up the memory hierarchy—e.g. to a memory backed by DRAM. At the same time, entries in the caches of the memory hierarchy are invalidated so that future accesses to the data are achieved by obtaining the data from the memory.

In some examples, the maintenance operation is configured to invalidate entries in the at least one unencrypted storage circuit associated with the one of the execution environments. The invalidation maintenance operation is therefore directed towards those entries in the unencrypted storage circuit (where the data is stored in an unencrypted manner) that are associated or that belong to a specific one of the execution environments. Data belonging to other execution environments remains valid unless/until targeted by other invalidation operations. The targeting of the entries that belong to the specific execution environment can be achieved by issuing cache maintenance operations to specific physical addresses (or ranges of addresses) that belong to the specific execution environment. The management execution environment that manages the execution environments can determine those physical addresses belonging to the execution environments. By indexing caches using physical addresses, each cache can quickly determine whether the relevant addresses are present in the cache or not. An alternative to this is for the cache maintenance operations to specify the execution environment whose entries are to be invalidated. This would require either a search of the cache (would could be time consuming) or an indexing of the cache according to the execution environment.

In some examples, the change in assignment is an assignment of memory to the one of the execution environments. In some other examples, the change in assignment could be a deallocation or unassigning of memory to the one of the execution environments.

In some examples, the maintenance operation is configured to invalidate entries in the at least one encrypted storage circuit associated with expired ones of the execution environments. Invalidation could be performed if/when an execution environment ends, when the memory will be re-assigned (or deallocated). By performing the invalidation when a previous execution environment ends, sensitive data is not kept in an unencrypted manner, which improves security of the system.

In some examples, each of the execution environments is associated with an encryption environment identifier used to generate the key input; and the maintenance operation is configured to invalidate entries in the memory hierarchy that are associated with the encryption environment identifier. An expired execution environment can therefore be identified within the memory hierarchy based on an encryption environment identifier that is specific to the execution environment that has expired. Of course, in some situations an encryption environment identifier might be used by multiple execution environments to allow the sharing of data between those multiple execution environments. In these situations, the encryption environment identifier might be used in an invalidation operation when all of the execution environments expire, or when a specific one or a specific subset of the execution environments expire. As explained above, an alternative way to achieve the invalidation is for a management execution environment (which is aware of the physical addresses assigned to each execution environment) to issue invalidation requests to the physical addresses that are associated with an execution environment whose entries are to be invalidated. This obviates any need to index caches according to the execution environment (identifier) or to search caches laboriously for relevant entries.

In some examples, a memory address to which the memory access request is issued is a physical memory address in one of a plurality of physical address spaces; and each of the physical address spaces is associated with one of the at least two domains. Each of the domains may therefore have its own physical address space.

In some examples, the memory protection circuitry defines a point of physical aliasing, located after at least one unaliased storage circuit of the memory hierarchy and before at least one aliased storage circuit of the memory hierarchy; the at least one unaliased storage circuit treats physical addresses from different physical address spaces which correspond to the same memory system resource as if the physical addresses correspond to different memory system resources. As well as the point of encryption (PoE), there may also be a point of physical aliasing (PoPA). Aliasing is inhibited prior to the point of physical aliasing. This means that two memory accesses sent to the same physical address in different physical address spaces will be treated (in components prior to the PoPA) as requests to different memory addresses. This can result in aliasing where the same data is stored twice in a cache under two entries.

In some examples, the point of physical aliasing is at or after the point of encryption. Therefore there are zero or more components of the memory hierarchy that have encryption and not physical aliasing.

In some examples, the point of physical aliasing is at the point of encryption. The point of encryption and the point of physical aliasing therefore occur at the same point in the memory hierarchy.

In some examples, in response to the memory transition request requesting a transfer of memory from an origin physical address space to a destination physical address space, the maintenance operation is configured to invalidate at least some entries in the at least one aliased storage circuit. Where memory (e.g at least one page) is to be transferred between the address spaces, a maintenance operation may extend up to the point of physical aliasing—but not beyond the point of physical aliasing. This may therefore extend beyond the point of encryption.

In some examples, the at least some of the entries are assigned to one of the at least two domains associated with the origin physical address space. The invalidation can therefore be limited to the entries that are moved from the origin physical address space.

The following description of examples may also be of relevance.

In some examples, there is provided an apparatus comprising: processing circuitry configured to perform processing in one of a fixed number of at least two domains, one of the domains being subdivided into a variable number of execution environments; memory translation circuitry configured, in response to a memory access request to a given memory address, to determine a given encryption environment identifier associated with the one of the execution environments and to forward the memory access request together with the given encryption environment identifier; storage circuitry configured to store a plurality of entries, each associated with an associated encryption environment identifier and an associated memory address, wherein the storage circuitry comprises determination circuitry configured to determine, in at least one enabled mode of operation, whether the given encryption environment identifier differs from the associated encryption environment identifier associated with one of the entries associated with the given memory address.

The at least two domains could be at least three domains. For instance, these might include a secure domain, a non-secure domain (which does not imply no security, merely less security than the secure domain), and a realm domain, which may be the domain that is subdivided into a plurality of execution environments. Access to resources between the different domains may be controlled. For instance, data belonging to processes that execute in the secure domain may not be accessible to resources that operate in the non-secure domain. Meanwhile, resources in the secure domain may not be accessed by resources that operate in the realm domain (and vice-versa) but both the realm domain and the secure domain may access resources in the non-secure domain. In these examples, each of the execution environments that operate in the subdivided realm has an associated encryption environment identifier that identifies an area of memory that can be used to store resources used by the execution environment in an encrypted manner. In this way, resources belonging to each execution environment can be isolated and protected from each other. The storage circuitry (e.g. a cache) can be used to store entries (e.g. cache lines). Each cache line can be associated by an execution environment identifier, which is to say not that the cache line is necessarily encrypted but could instead be stored unencrypted and in association with that encryption environment identifier. Each of the entries (e.g. cache lines) also has an associated memory address (e.g. the location in the area of memory to which the cache line relates). When a memory access request is issued in behalf of one of the execution environments, it will acquire the encryption environment identifier associated with that execution environment. The memory access request will then travel through the memory hierarchy towards the main memory. In some cases, the data to which the memory access request relates will already be stored in the storage circuitry (e.g. a cache). Under normal circumstances, for the data to be returned, the encryption environment identifier associated with the memory access request is required to match the encryption environment identifier that is associated with the entry of the storage circuitry that contains the data to which the memory access request is issued. In these examples, determination circuitry is provided in order to make that determination. The apparatus may be capable of switching between the enabled modes of operation, or a current mode could be fixed.

In some examples, the apparatus comprises memory protection circuitry configured to use a key input to perform encryption or decryption on the data of the memory access request in response to the data being absent from the storage circuitry, wherein the key input is based on the given encryption environment identifier; the key input for each of the domains is fixed at boot time of the apparatus; and the key input for each of the execution environments is dynamic. The encryption environment identifier is used by the memory protection circuitry to determine the key input (e.g. a key, a part of a key, one or more tweakable bits). The key input is used to achieve encryption and decryption for the execution environments and for the domains. It is therefore different for each domain and for each execution environments. The key inputs for the domains is fixed when the apparatus starts up. On the other hand, since the execution environments may dynamically start, stop, and change, the key inputs for the execution environments are determined dynamically.

In some examples, the storage circuitry is configured, in at least one error mode of operation, to perform an error action in response to the given encryption environment identifier differing from the associated encryption environment identifier that is associated with the given memory address. In these examples, the apparatus responds to a mismatch when it occurs and the response to that mismatch is to perform an error action. In situation where no mismatch occurs, the memory access request proceeds as normal.

In some examples, the at least one enabled mode of operation comprises a poison mode of operation in which, in response to the associated memory address of the one of the entries being the given memory address when the given encryption environment identifier differs from the associated encryption environment identifier associated with the one of the entries, the storage circuitry is configured to poison the one of the entries. The entry is poisoned, thereby making the entry a poisoned entry. That is that some or all of the entry will create an error if and when consumed by the processing circuitry at a later date. By poisoning the entry and deferring any error that might arise, it is possible to prevent the reading of data that might be private (in the case of a read request) or preventing the use of corrupted data (in the case of a write request). However, if that data is never again read from then the error need not arise. A lack of consumption might occur, for instance, in the case of prefetching or of speculative execution. In the case of a memory access request that is a memory read request, the data may be almost immediately consumed, leading to an immediate error.

In some examples, the processing circuitry is configured, when the one of the entries is received by the processing circuitry, to generate an exception. A poisoned entry therefore remains unusable by the processing circuitry.

In some examples, when the memory access request is a write memory access request, those portions of the one of the entries that are accessed by the (mismatched) write memory access request are modified and remaining portions of the one of the entries are poisoned. A write request may only modify a part of one of the entries (e.g. cache lines) of the storage circuitry (e.g. a cache). In these situations, those parts of the entry that seek to be modified by the memory access request are modified. Meanwhile, other parts of the entry that the access request does not seek to modify remain as-is but are poisoned so that, if accessed in the future, an exception will be raised by the processing circuitry.

In some examples, the at least one enabled mode of operation comprises an aliasing mode of operation in which the storage circuitry is configured to treat the entries of the storage circuitry as different when the associated memory address of the entries match and when the associated encryption environment identifier of the entries mismatch. In these examples, rather than cause an error to occur in response to a mismatch, each entry effectively treats the encryption environment identifier as part of the address. Two entries to the same address, with different encryption environment identifiers are treated as two separate and distinct entries. Thus, mismatches "cannot" occur—a memory access request to one memory address with one encryption environment identifier is seeking to access a different item of data to an entry associated with the same memory address and a different encryption environment identifier.

In some examples, the at least one enabled mode of operation comprises a cleaning mode of operation in which, in response to the associated memory address of the one of the entries being the given memory address when the given encryption environment identifier differs from the associated encryption environment identifier associated with the one of the entries, the storage circuitry is configured to clean and invalidate the one of the entries. In these examples, a mismatch is handled by writing back the existing entry of the storage circuitry to a point in the memory hierarchy where encryption is performed using the encryption environment identifier (e.g. main memory). The entry in the storage circuitry is then invalidated such that it cannot be accessed.

In some examples, in the cleaning mode of operation, in response to the associated memory address of the one of the entries being the given memory address when the given encryption environment identifier differs from the associated encryption environment identifier associated with the one of the entries, the storage circuitry is further configured to treat the memory access request as a miss in the storage circuitry. Having written back (cleaned) the data, and then invalidated it, the memory access request can be treated as missing in the storage circuitry. The request can therefore be reissued into the memory hierarchy, with the requested data eventually being passed back to the storage circuitry for storage.

In some examples, the processing circuitry is configured to speculatively issue the memory access request as a speculative read request while in a speculative mode of operation; and the speculative mode of operation is disabled unless the storage circuitry is in the enabled mode of operation. Speculative read requests, produced when speculating on the outcome of a branch instruction for instance, might occur using an incorrect encryption environment identifier. For instance, a speculative read request might be permitted for a normal memory (e.g. DRAM) address that has a valid MMU mapping. However, such accesses should not be permitted if the MECID is 'wrong' for that location. A traditional hypervisor might have its own virtual address mappings for all of DRAM, independent to the mappings of virtual machines overseen by that hypervisor. For realms with a MECID, if any realm manager had mappings to all of the DRAM, then the CPU would be able to speculate into those addresses regardless of whether the 'correct' realm MECID value was present or not. Consequently, a secure system should either prevent speculative read requests from occurring, or should implement one of the previously mentioned enabled modes in which a mismatch between encryption environment identifiers is caught (or prevented outright).

In some examples, the at least one enabled mode of operation comprises an erasing mode of operation in which, in response to the associated memory address of the one of the entries being the given memory address when the given encryption environment identifier differs from the associated encryption environment identifier associated with the one of the entries, the storage circuitry is configured to perform an erasure of the one of the entries. An erasure of the entry differs from an invalidation in which the data is merely marked as being invalid and not accessible in that the data actually stored in the storage circuitry is removed. There are a number of ways in which this can be achieved.

In some examples, the storage circuitry is configured to perform the erasure by zeroing or randomising the one of the entries. By zeroing the data, the data is replaced by a predefined sequence (typically of the bit '0', but the use of the bit '1' could also be referred to as 'zeroing'), with the predefined sequence having no appreciable meaning. Another alternative is to scramble or randomise the data of the entry. In any event, the original meaning of the data is removed so that it can no longer be determined.

In some examples, when the memory access request is a write memory access request, the storage circuitry is further configured to update the associated encryption identifier to correspond with the given encryption environment identifier. In addition to the previously described actions, the act of writing to a particular entry where a mismatch occurs can cause the encryption environment identifier associated with that entry to be overwritten by the encryption environment identifier associated with the memory access request.

In some examples, the determination circuitry is configured, in at least one disabled mode of operation, to inhibit determination of whether the given encryption environment identifier differs from the associated encryption environment identifier associated with one of the entries associated with the given memory address. The disabled mode(s) of operation thereby disable or inhibit the mismatch detection from taking place. Thus, any mismatches that might occur are essentially ignored. This can therefore result in the plain text of any entry of the storage circuitry from being leaked to other execution environments. In practice, other protection mechanisms may exist that prevent this from happening. For instance, a management system might prevent memory access requests being issued that relate to another execution environment.

In some examples, in at least some of the at least one enabled mode of operation, in response to the associated memory address of the one of the entries being the given memory address when the given encryption environment identifier differs from the associated encryption environment identifier associated with the one of the entries, the storage circuitry is configured to generate an asynchronous exception. In an asynchronous exception, the exception is out-of-step with the code that lead to the exception. That is to say that the exception can be raised. However, it may not be handled until (possibly nondeterministic) time later. This does, however, permit the debugging or the detection of leaked data. There are a number of ways in which the asynchronous exception can be raised.

In some examples, the storage circuitry is configured to generate the asynchronous exception, and to store in one or more registers accessible to the processing circuitry details of the memory access request. Data relating to the memory access request—such as the memory address to which the access is being made, the type of access (a read or a write), the execution environment to which the memory access request is made, the execution environment to which the memory address is associated in the storage circuitry, etc. can be stored in those registers. This can be used in order to achieve debugging and/or detection of the situation that lead to the encryption environment mismatch.

Particular embodiments will now be described with reference to the figures.

Figure 1:
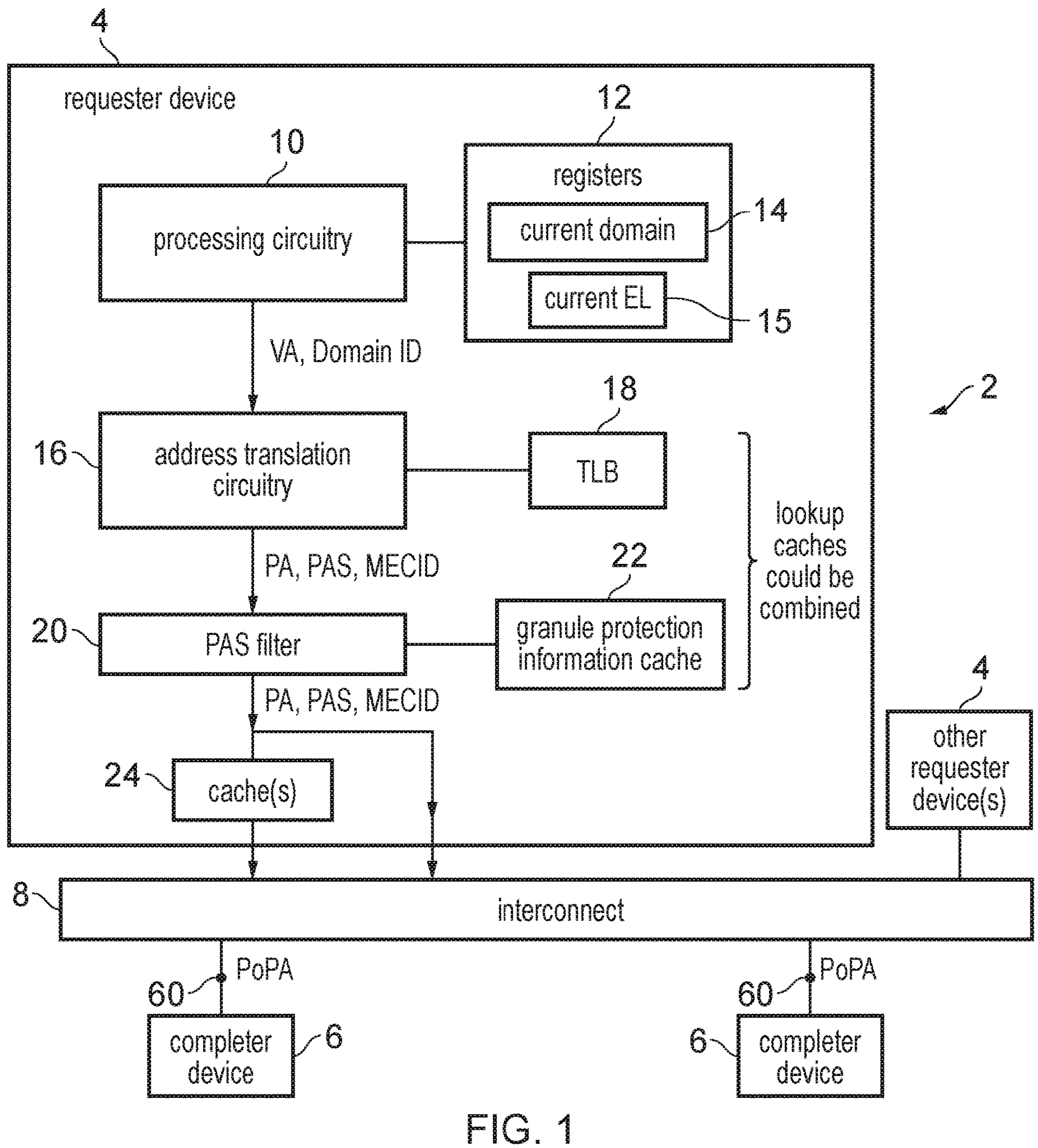
FIG. 1 shows an example in accordance with some embodiments.

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address, outputs a physical address space (PAS) identifier identifying the selected physical address space, and also provides a MECID, the purpose of which is described in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
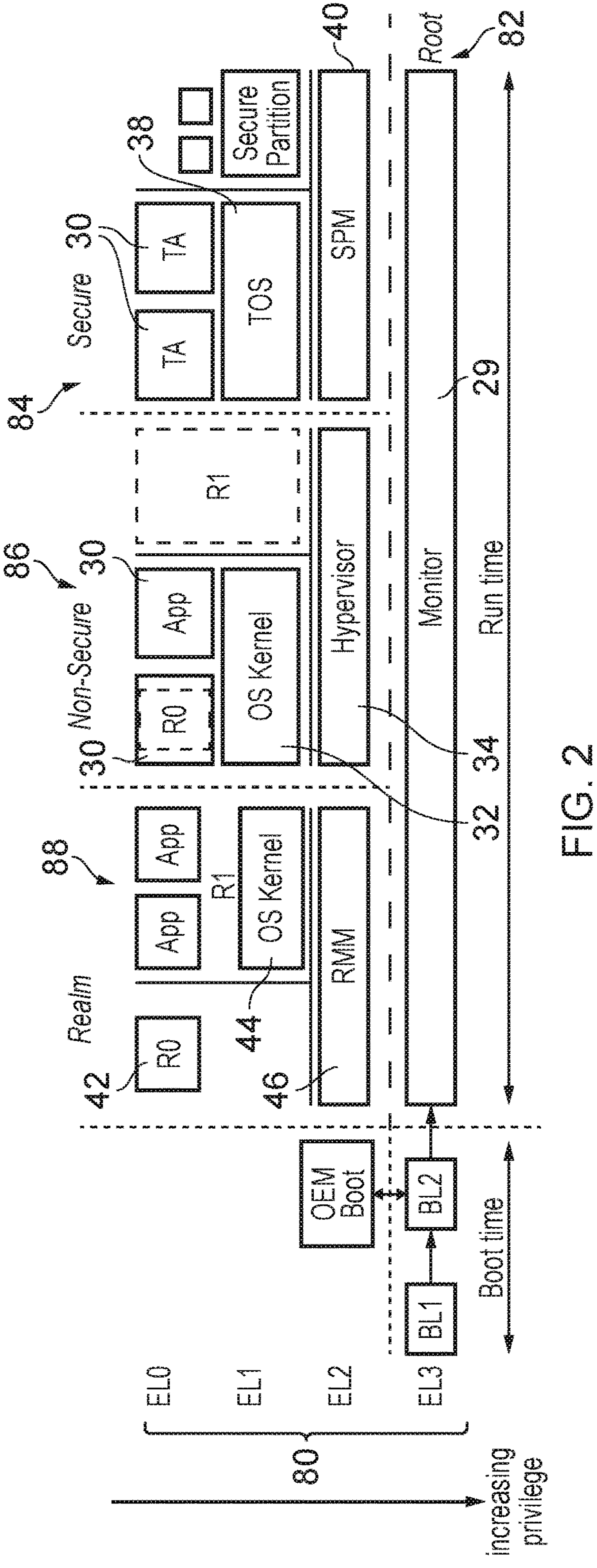
FIG. 2 shows an example of a separate root domain, which manages domain switching.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 84. In the realm domain, the software executed can include a number of realms (or execution environments), where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate physical addresses (when the translation is triggered by EL0 or EL1 code in an operating state where a further stage 2 translation by the stage 2 MMU 52 is required). The stage 2 MMU may translate intermediate physical addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier, or this can come from address translation circuitry. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the requestor r without diminishing the security guarantees comparing to completer filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller 68 that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

In the example of FIG. 3, a MECID consumer 64 is also illustrated. This, together with the PAS TAG stripper 60 collectively form memory protection circuitry 62. The MECID consumer 64 consumes the MECID that is provided by the memory translator 16, each of the MECIDs being associated with a different realm or execution environment. The MECID consumer 64 provides, based on the MECID, a key input, which is used to encrypt data past the Point of Encryption (PoE). This encryption may be separate to the encryption performed based on the PAS. It is therefore possible for each realm (each of which can be associated with a different MECID) to individually encrypt its own data in a way that the data cannot be accessed by other realms. Thus, even if there were to be an error, misconfiguration, or attack on the RMM 46, which allowed one realm to access the physical address space of another realm, the data belonging to the other realm would have no meaning to it.

Note that in this example, the PoE and the MECID consumer 64 are illustrated as being combined with the PAS TAG stripper 60. In principle, the PoE could be anywhere between a provider of the MECID (e.g. the address translation circuitry 16) and the PoPA 60 and the two elements 60, 64 could be performed sequentially rather than together. Elements of the memory hierarchy that occur between the requester device and the PoE will store data in an unencrypted manner and with the corresponding MECID. In contrast, other elements of the memory hierarchy (past the PoE) will store the data in an encrypted manner without the corresponding MECID.

FIG. 4 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 4 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 86 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 4, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Parts of the realm PAS are assigned to each currently active realm within the system. Access to these sub-areas 90, 92 within the realm PAS can be restricted/controlled by the RMM 46 as previously discussed. However, in addition to this, the contents of each sub-areas 90, 92 can be encrypted differently depending on the realm associated with that sub-areas in the realm PAS. For instance, a first sub-area 90 is associated with a first realm RO and the data within that sub-area is therefore encrypted in a different manner to the contents of a second sub-area 92 that is associated with a second realm RI. In addition to this, each PAS is encrypted. In the example of FIG. 4, each PAS is encrypted using a different key and then the sub-areas are further encrypted using different individual keys. In other embodiments, the realm domain itself may not have one overall key and the individual realms themselves may be encrypted instead. In each realm/execution environment has its own encrypted area of the PAS that other execution environments (realms) cannot access. In addition to this, as a consequence of encryption, the realms cannot access the secure realm or the root realm.

Note that in a memory access request, the PAS is provided together with the physical address. As a consequence of this, the memory treats two requests to the same physical address (with different PASs) as requests to different physical addresses even though the same physical address is actually being accessed. This 'aliasing' is important because it provides a more secure separation of the PASs. Consequently cache timing attacks, where inferences are made about privileged data based on whether or not that privileged data is present in a cache, become infeasible if not impossible. The data stored in a cache for one PAS is not accessible to another PAS.

FIG. 5 summarises the operation of the address translation circuitry 16 and PAS filter. The PAS filtering 20 can be regarded as an additional stage 3 check performed after the stage 1 (and optionally stage 2) address translations performed by the address translation circuitry. Note also that the EL3 translations are based on page table entries which provide two bits of address based selection information (labelled NS, NSE in the example of FIG. 5), while a single bit of selection information "NS" is used to select the PAS in the other states. The security state indicated in FIG. 5 as input to the granule protection check refers to the Domain ID identifying the current domain of the processing element 4. The MECID is provided by the stage 2 MMU in the case of EL0 and EL1 whereas the MECID is provided by the stage 1 MMU in the case of software executing at EL2 and EL3.

In practice, there is no need for the translation tables to store the MECID directly and indeed, doing so would dramatically increase the size of the page table entries. Instead, as shown in FIG. 6, each entry 98 of a page table in the address translation circuitry 16 contains attributes 100, which could indicate the access permissions, memory types, access, and dirty state, etc. A PAS indicator field 102 is used to indicate which PAS is in use for the entry. In the case of the EL3 stage 1 translation table, the NS and NSE bits are used to define the PAS (i.e. whether the root domain, secure domain, realm domain, or non-secure domain is being referred to). At the EL2 stage 1 table, and at the EL1& 0 stage 2 table, it is the NS bit that is used on its own in the realm (and sometimes secure) states. This allows access to either target, i.e. NS=0 refers to the realm (or secure) PAS and NS=1 refers to the non-secure PAS. In addition, an AMEC flag 104 is provided. This indicates which MECID storage register is to be used to provide the MECID value. In this case, the AMEC field is 1-bit (0 or 1) and therefore indicates whether the value stored in a first register 94 should be used or whether the value stored in a second register 96 should be used. Other numbers of registers could of course be provided, with a subsequent increase in the size of the AMEC field. Finally, each entry 98 of the page table contains a (physical) page number 106 to which the entry 98 relates. Having established the MECID, it is provided as part of the outgoing memory request, where it is eventually consumed by the MECID consumer 64 in order to perform encryption/decryption.

By storing the MECID(s) themselves in the registers 94, 96, and by only storing an indicator in the entry 98 of the page table, it is possible to keep the page table smaller. By providing a set of registers 94, 96 it is possible for multiple MECIDs to be used simultaneously—for instance, if a particular realm has its own MECID but also has access to an area of the physical space that is shared with another realm then the realm's own MECID and the MECID for the shared space could both be stored simultaneously. Similarly, the hypervisor 34 might use the alternate MECID register 96 to load the MECID of a realm in order to access the physical address space belonging to that particular realm. By providing multiple MECID registrars 94, 96, it is also possible to keep the MECID size independent from the format of the page table. It is also possible to use large MECIDs (e.g. values that span multiple registers). In some examples, the multiple registers could be used to store different MECIDs for different virtual to physical translation regimes. For instance, for each of the different exception levels shown in FIG. 5, a different MECID register could be used for that realm.

It will be appreciated that the RMM 46 and/or hypervisor 34 are responsible for loading the correct MECID values into the registers 94, 96 during a context switch operation. That is, the MECIDs used by the newly active realm will be loaded into those registers 94, 96.

FIG. 7 illustrates an example of the MECID consumer at a PoE 64 operating together with a PAS TAG stripper at a PoPA 60. Here, the incoming memory access request is received, together with a MECID and PAS. The incoming memory access request therefore misses or is discarded from other caches 24 of the memory hierarchy.

Where a memory access arrives at the MECID consumer 64, the PAS is used to look up a corresponding first key input and the MECID is used to look up a corresponding second key input. Where multiple MECID tables are provided (e.g. for each PAS), the PAS is also used to select which MECID table to use to obtain the second key input. The key inputs could be keys, which perform a first stage and a second stage of encryption. Alternatively the key inputs could be keys that are mathematically combined together (e.g hashing the bits together or appending) to form a further key. In some examples, each of the two inputs is a portion of a key (with a default value being used or provided for Worlds other than the realm world). The key inputs could also or alternatively be tweakable bits. Other possibilities or combinations of these possibilities will also be appreciated by the skilled person. In any event, the key input(s) are passed to an encryption/decryption unit 108. This performs encryption (on a memory write request) or decryption (on a memory read request) using the key input(s) and the data itself. In the case of a memory write request, the encrypted data is then written in memory and in the case of a memory read request, the decrypted data is provided back to the requester device 4.

Thus, the MECID itself is not the key (or key input), which might in fact be much larger than the MECID. This saves the need for a much larger key to be transmitted across the system fabric 24, 8. However, in examples where the PoE is much nearer to the generator of the MECID (e.g. the address translation circuitry 16), it may be more practical to transmit the key input itself.

As realms are created, new entries are added to the MECID consumer 64. Similarly, as realms are deleted or ended, those entries in the storage of the MECID consumer 64 are deleted and the data belonging to that process may no longer be read. In contrast, the key inputs provided for each PAS are static and determined when the apparatus starts up.

In examples where the PoE and the POPA are separate, a first stage of encryption (e.g. for the specific realm) and a second stage of encryption (for the PAS) may be performed.

The above description has focussed on the use of the MECID and the encryption/decryption in respect of realms. However, the same technique could also be applied within other Worlds or domains such as the Secure world/domain.

FIG. 8 illustrates a flowchart 110 in accordance with some of the above examples where a key is obtained using the two inputs (as opposed to the inputs being used directly in the encryption/decryption stage). At a step 112, the memory access request is received. At a step 114 a first key input is obtained for the particular domain (e.g. based on the PAS). This key input is fixed at boot time. At a step 116, a second key input is obtained based on the current execution environment. This key input is dynamic in the sense that it exists as long as the associated execution environment(s) for this exists. At a step 118, a key is obtained using the key inputs. Then, at step 120 it is determined whether the memory access request is a write request or not. If not, then at step 122 the data obtained from memory is decrypted using the key. Otherwise, at step 124, the data is encrypted using the key and stored into memory. As explained above, the explicit step 118 of obtaining the key could be omitted and the key inputs used directly in the decryption 122 and/or encryption 124 steps.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier, together with the MECID register 94 and ALT MECID register 96 described earlier.

The simulation code includes memory protection program logic 416 and address translation program logic 414 which emulate the functionality of the MECID consumer 64 and address translation circuitry 16 respectively. Hence, the address translation program logic 414 translates virtual addresses specified by the target code 400 into simulated physical addresses in one of the PASs (which from the point of view of the target code refer to physical locations in memory), but actually these simulated physical addresses are mapped onto the (virtual) address space of the host processor by address space mapping program logic 415. The memory protection program logic 416 'consumes' the MECID provided as part of a memory access request and provides one or more key inputs, which are used to encrypt/decrypt data from the memory.

FIG. 10 illustrates the location of the Point of Encryption and the extent to which clean-and-invalidate operations extend within the system. As previously described address translation circuitry 16 in the form of one or more stages 50, 52 of an MMU are used to translate a virtual address (VA) into a physical address (PA) and, where the access is made by an execution environment, a MECID. The MECID is an example of an encryption environment identifier that is used to encrypt data past the PoE for a specific execution environment. A granular memory protection unit 20 is used to provide the PAS TAG associated with the physical address space to be accessed (although this could also be provided directly from the address translation circuitry 16). The combination of PAS TAG PA, and (where appropriate) MECID is used to access data held in a particular physical address space (identified by the PAS TAG) at a particular physical address (identified by the PA) associated (if applicable) with a particular execution environment (using the MECID). Past the PoE, any MECID is consumed and used to perform encryption/decryption to storage circuits beyond the PoE.

As shown in FIG. 10, the PoE could lie anywhere within the cache hierarchy 24. As it moves closer to the processor, more of the caches store encrypted data. As the PoE moves closer to the memory, fewer caches store the encrypted data and instead store unencrypted data together with the MECID. For instance, in the example of FIG. 10, the cache hierarchy 24 is made up of a level one cache 130, a level two cache 132, and a level three cache 134. If the PoE lies between the level one cache 130 and the level two cache 132 then data will be stored unencrypted in the level one cache 130 and encrypted in the level two cache 132, the level three cache 134 and main memory. In contrast, if the PoE lies between the level two cache 132 and the level three cache 134 then data will be stored encrypted in the level three cache 134 and main memory, but will be unencrypted in the level one cache 130 and the level two cache 132.

Where the PoE and the PoPA differ, encryption with respect to the MECID happens by the PoE while further encryption can happen at the PoPA (for the different PASs). Note that in some embodiments, encryption for data within a PAS that is already encrypted at the PoE does not occur.

During operation of the caches it may be necessary for maintenance operations to be performed. This include clean-and-invalidate operations (which are a particular type of invalidation operation), which may be performed as a consequence of a change in memory assignment (such as removal from an execution environment, or assignment to a new execution environment). At least some of these cache maintenance operations are only performed up to the PoE and not beyond it. For instance, when an execution environment expires, the data belonging to that execution environment must continue to be protected. Past the PoE, the data is encrypted and so provided the keys for the encryption are deleted, the data can no longer be accessed. Prior to the PoE in the cache hierarchy 24, however, the data is stored in an unencrypted manner and so should be removed from the cache to prevent a different execution environment with the same MECID accessing that data (the MECID identifier space might be small and therefore reused). In order to achieve this, cache maintenance operations are performed up to the PoE thereby causing the data to be invalidated (and therefore made no longer accessible). In some embodiments, the actual operation is a clean-and-invalidate operation even though the cleaning of the data (writing it back to the memory) has no effect for an expired execution environment.

FIG. 11 shows the relationship between the cache hierarchy 24, the PoE 64 and the PoPA 60. As previously described, the PoE 64 can lie anywhere within the cache hierarchy 24. For instance, the PoE 64 could occur after all of the caches in the cache hierarchy 24, prior to the main memory or it could lie prior to the cache hierarchy 24. The PoPA 60 lies on or after the PoE 64. For instance, the PoE 64 and the PoPA 60 could lie at the same point somewhere in the cache hierarchy 24. In some examples, the PoE 64 and PoPA 60 could lie at alternate ends of the cache hierarchy—i.e. the PoE 64 could occur before the cache hierarchy 24 and the PoPA 60 could occur at the end of the cache hierarchy 24. There are therefore potentially three different 'zones' within the memory hierarchy—a first set of storage circuits (up to the PoE 64) in which data is both unencrypted and aliased, a second set of storage circuits (between the PoE 64 and PoPA 60) in which data is encrypted and aliased, and a third set of storage circuits (past the PoPA 60) in which data is encrypted and unaliased.

As previously explained, cache maintenance operations that relate to the change in memory assignment are issued to those caches in the cache hierarchy prior to the PoE 64 but not past the PoE 64. Other cache maintenance operations (such as the movement of data or memory pages from one domain to another) may go past the PoE 64 and up to the PoPA 60 and still other cache maintenance operations might permeate the entire memory hierarchy.

FIG. 12 shows a flowchart 140 that illustrates the behaviour of the cache maintenance in more detail, from the perspective of a particular cache. At a step 142, a cache maintenance operation (CMO) is received by a cache. The cache maintenance operation contains an indication of a target and the location of the PoE 64. The target could, for instance, be a physical address that is associated with a particular area of memory that is transferred (e.g. that belongs to an execution environment that is known to have expired) or could target the MECID itself depending on the architecture of the caches. At a step 144, the cache determines whether it is before the PoE 64 in the hierarchy. If not, then there is nothing further to be done and the process ends (or returns to the start). Otherwise, at step 146, the target is cleaned and invalidated. Then at step 148, a new CMO is issued to the cache(s) at the next cache level. The new CMOs contain the same target and the same indication of the PoE 64. In this way, only cache lines that are targeted by the CMO are invalidated. However, this only occurs up to the PoE 64. Past that point, the CMOs of this kind are ignored and not forwarded. The data belonging to the targeted cache lines is encrypted past the PoE 64, so the invalidation of those cache lines is not strictly necessary.

Other cache maintenance operations could also apply and are handled in the usual manner. That is to say that they may still be propagated past the PoE 64 (if appropriate).

Consequently, different cache maintenance instructions can be issued for each movement of memory between execution environments, and for the movement of memory between domains. Still further instructions could be provided for other cache maintenance operations.

FIG. 13A illustrates the targeting of the cache maintenance operation. In this example, the maintenance operation is caused by an assignment of memory to an execution environment. This might occur, for instance, due to the expiration and/or creation of a particular execution environment. The realm management module (RMM) causes the cache maintenance operations to be performed for addresses 0x2132 and 0xC121. However, a hypervisor 32 or operating system could similarly be responsible for such operations being performed. In any event, cache maintenance operations are sent to the level one cache 130. These cause corresponding entries in the cache to be invalidated. The cache maintenance operations are then sent through the memory hierarchy up to the PoE 64 but not beyond. In this case, this includes the level one cache 130 and the level two cache 132. However, the level three cache 134 is not affected, which is to say that the cache maintenance operations are not forwarded. In each case, entries (which are unencrypted, due to the relevant caches being prior to the PoE 64) tagged with the address 0xC121 or 0x2132 are invalidated (or cleaned and invalidated). No invalidation occurs (as a consequence of these CMOs) past the PoE 64 because those entries are encrypted and cannot be accessed.

FIG. 13B illustrates the targeting of the cache maintenance operation. In this example the maintenance operation is caused by the expiration of an execution environment (0xF1). The expiration of an execution environment is managed by the realm management module (RMM) 46 although similar cache maintenance operations could alternatively be issued by a hypervisor 34 for instance. In any event, an instruction is issued to signify that memory associated with this execution environment should be invalidated. The MECID for the corresponding execution environment is looked up. Again, this may be performed by the RMM or hypervisor 34, but could also be determined by another component. The invalidation instruction is then sent out, referring to the specific MECID associated with the execution environment that has expired (in this case 0xF14E). As previously explained, this invalidation instruction is sent through the memory hierarchy up to the PoE 64 but not beyond. In this case, this includes the level one cache 130 and the level two cache 132. In each case, entries (which are unencrypted, due to the relevant caches being prior to the PoE) tagged with the MECID 0xF14E are invalidated (or cleaned and invalidated).

Note that the lookup that is performed between the execution environment and the MECID allows for MECIDs that are not associated with any single execution environment thereby allowing the sharing of data. In these situations, entries belonging to such a MECID could be invalidated when a specific one of the associated execution environments terminates (if, for instance, one of the execution environments acts as a 'master' of the MECID) or could be invalidated when all of the associated execution environments terminate. A further reason for separating the execution environment identifier and the MECID is to limit reuse of the MECIDs and to allow more MECIDs to exist concurrently than are currently active. For instance, execution environments could be made dormant (non-active) but their data could remain within the system. In this example, for instance, there may only be 256 execution environments that can concurrently run (because the execution environment identifier is 8-bit). However, the MECID identifiers are larger (16 bit) and thus, the execution environments can be swapped in and out.

As a consequence of the above, the cache hierarchy is less impacted by the cache maintenance operations. This is because certain cache maintenance operations (e.g. those that invalidate an expired execution environment) need not occur past the PoE. The system impact of the invalidation requests can therefore be reduced. This does not compromise security because past the PoE, the data is encrypted and thus, even if another execution environment were to access those memory items, they would not be intelligible. The cache maintenance operation of invalidating those data entries therefore does not serve a useful purpose.

FIG. 14 illustrates a method of data processing 140 in accordance with some examples. At a step 142, processing is performed in one of a plurality (e.g. two or more such as three or more) of domains. One of those domains is subdivided into a number of execution environments (e.g. realms). The processing accesses memory within a memory hierarchy. At a step 144, a point of encryption is defined within the memory hierarchy. This divides the memory hierarchy into encrypted components (where the data is stored in encrypted form) and unencrypted components (where it is not). Then, at a step 146, at least some maintenance operations that are to be issued (such as those associated with expired execution environments) are inhibited from being issued at or beyond the PoE 64. These cache maintenance operations are not issued to storage circuits where the data is stored in an encrypted form.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier, together with the MECID register 94 and ALT MECID register 96 described earlier. Similarly, storage circuit emulating program logic 148 maintains a data structure in a host address space of the host processor, which emulates the memory hierarchy. Hence, instead of data being stored in a level one cache 130, a level two cache 132, a level three cache 134, and a memory 150 as in the example of FIG. 10 (for instance), it is instead stored in the memory of the host processor 430, with the storage circuit emulating program logic 148 mapping memory addresses of instructions of the target code 400 to corresponding addresses for obtaining the simulated memory addresses from the host memory.

The simulation code includes memory protection program logic 416 and address translation program logic 414 which emulate the functionality of the MECID consumer 64 and address translation circuitry 16 respectively. Hence, the address translation program logic 414 translates virtual addresses specified by the target code 400 into simulated physical addresses in one of the PASs (which from the point of view of the target code refer to physical locations in memory), but actually these simulated physical addresses are mapped onto the virtual storage structures 130, 132, 134, 150 that is emulated by the storage circuit emulating program logic 148 by the address space mapping program logic 415. The memory protection program logic 416 'consumes' the MECID provided as part of a memory access request and provides one or more key inputs, which are used to encrypt/decrypt data from the memory as previously described. The storage circuit emulating logic 148 may also emulate both the functionality of the cache maintenance operations, the point of encryption 64, and the point of physical aliasing 60 as previously described.

FIG. 16 illustrates an example system in accordance with some examples. In these examples a memory access request to a virtual address is issued by an execution environment (realm) running in a subdivided world/domain (namely the realm domain) on the processing circuitry 10. The memory access request is received by the memory translation circuitry (e.g. address translation circuitry) 16. Here, the virtual address (VA) is translated into a physical address (PA). Additionally, the PAS is determined and the MECID are determined as previously described. The memory access request is then sent to the memory hierarchy to locate the requested data. In this example, it is received by storage circuitry in the form of a level one cache 130. Since the level one cache, in this example, comes before the PoE 64, the contents of the level one cache 130 are unencrypted. Each unencrypted cache line entry therefore stores data in association with the address of the cache line, a PAS, and a MECID.

A 'hit' occurs on the cache if/when the physical memory address (PA) corresponds with one of the cache lines stored in the cache. In this situation, the requested data is returned and the memory access request therefore need not progress to the main memory 150. In contrast a 'miss' occurs when none of the cache lines correspond with the requested physical memory address (none of the cache lines store the data being requested). In this situation, the memory access request is forwarded further up the memory hierarchy towards main memory 150. When the requested data is located (which may be in main memory), the data can be stored in lower level caches 130 so that it can be accessed again more quickly in the future.

As previously mentioned, each cache line in the cache 130 stores data in associated with the physical address of the cache line, the data of that cache line, the identity of the physical address space (PAS) to which the data is associated and the MECID, the latter of which is an example of an encryption environment identifier and can be associated with a subset of the execution environments (often one specific execution environment). This is the execution environment (or environments) that 'own' the data. In response to a hit, the determination circuitry 180 determines whether there is a match between MECID of the hitting entry of the storage circuitry 130 and the MECID provided in the memory access request.

FIG. 17 illustrates an example of a MECID mismatch. This can occur for a number of reasons. For instance, the tables in the memory translation circuitry 16 might contain multiple entries (each belonging to a different MECID) for the same PA. There may also be insufficient cache maintenance operations performed when a MECID is re-assigned. The MECID width might be too large for the system, resulting in the component of the MECID that is actually used being repeated. In some situations, the mismatch might occur due to insufficient translation lookaside buffer (TLB) maintenance and barriers when MECID registers are updated.

In any event, this example illustrates a memory read request that is issued from the memory translation circuitry. The request is directed to a physical address 0xB1432602. This is made up of a cache line address 0xB14326 and an offset into the cache line of 02, which is the specific part of the cache line that the memory read request is seeking to read. The request is also directed towards a PAS of 01 (which in this example refers to the realm PAS) and a MECID of 0xF143, which is the MECID associated with the execution environment or realm for which the memory read request is issued. This is received by the storage circuitry 130, which determines whether there is a hit on the memory address being accessed. In this case, there is a hit, because the storage circuitry 130 contains an entry with the cache line address 0xB14326. The PAS (01) also matches. However, in this case, although there is a hit, the determination circuitry is able to determine (by comparison) that the MECIDs mismatch. In particular, the MECID that is sent with the request is 0xF143 whereas the MECID stored for the cache line is 0xF273. Thus, the request is being issued by an execution environment that should not have access to the line. An error action can therefore be raised.

Recall that a MECID does not necessarily identify a specific execution environments because a MECID could be associated with several execution environments (in the situation where data is to be shared between those execution environments).

There are a number of error actions that can be taken, as well as a number of configurations that can be adopted in order to prevent the mismatch from occurring.

FIG. 18 illustrates a poison mode of operation that causes, in response to the mismatch, the relevant cache line to be poisoned. Here, a memory write request is issued that targets a specific part of the cache line. However, a mismatch occurs with the MECIDs. In this example, the targeted portion of the cache line is overwritten/modified by the write request. These portions are now expected to be correct and so are not poisoned. However, other portions of the cache line are noted as being poisoned. If those poisoned parts of the cache line are read by the processing circuitry in the future (e.g. as the result of a later memory read request to those portions of the cache line) then the poison notation will be provided back to the processing circuitry. This, in turn, causes a synchronous error to be raised by the processing circuitry.

By not immediately creating an error, it is possible that any such error can be avoided completely. For instance, if no future memory read request is issued to the other parts of the cache line then the poison notation is never delivered back to the processor and the error never arises. Thus, although the mismatch should not have occurred, it has no effect.

In other embodiments, the entirety of the cache line could be poisoned as a result of a write to any part of the cache line, since the overwritten data could be said to have resulted in corruption of the original data. In other examples, a memory read request will result in part or all of the cache line being poisoned and immediately returned to the processing circuitry, which will (almost immediately) cause a synchronous error to arise. In some examples, all or part of the data returned from the cache as part of a read request is poisoned, but the cache line itself is left unmodified.

Also in this example, as well as poisoning the mismatching cache line, the MECID of the cache line is updated to the MECID provided in the memory access request.

FIG. 19 shows an example implementation in which an aliasing mode of operation is shown. Here it is determined whether a memory read request hits or misses based on the PA, the PAS, and the MECID. That is, all three components are used to form an 'effective address'. In this example, a first read request is directed to an address 0xB1432620 and uses a MECID of 0x2170. Ostensibly, the address should hit on the entry 182 in the cache 130 because the PA matches. However, since the MECID, PAS, and PA are treated as an overall effective 'address' and since all three do not match (the MECID of the entry 182 is 0xF273 compared to the MECID of the request, which is 0x2170) there is a miss. This can be determined by the determination circuitry 180, which seeks a match on each of the PA, the PAS, and the MECID.

In contrast, a second memory read request made to exactly the same PA and PAS with a different MECID of 0xF273 will hit because the PA, PAS, and MECID both match).

This therefore prevents a mismatch from occurring because a memory access request to a physical address can only hit the cache line if the PA, PAS, and MECID are all the same in the cache line and memory access request.

There are a number of actions that can be taken in response to the miss. In some examples, the mismatch on only the MECID can be used to inhibit the request from going any further. In other examples, the miss will be forwarded up the memory hierarchy. When the request reaches the PoE, the incorrect MECID will be used to select a key input, which therefore is likely to result in incorrect deciphering of the requested data (in the case of a read request) or the incorrect encoding of provided data (in the case of a write request). However, in both cases, the goal of maintaining the secrecy of the data is maintained.

FIG. 20 illustrates an example of a cleaning mode of operation. Here, when a mismatch is detected, the mismatched cache line in the cache 130 is cleaned (written back further up the memory hierarchy, such as to past the point of encryption, such as to memory). The mismatching line is then invalidated and the requested line is then fetched from memory.

Therefore in this example, the memory access to read at address 0xB1432620 with MECID 0xF273 mismatches on the cache line address 0xb14326 with MECID 0x2170. The cache line is therefore written back to memory (cleaned) and invalidated (the 'V' flag is changed from 0 to 1). The subject matter of the request (address 0xB1432620) is then fetched from memory with MECID 0x2170. In practice, this memory access request may still fail if the MECID is not correct in the memory hierarchy. In particular, past the point of encryption, if the MECID is incorrect then the wrong key inputs will be selected for decryption and garbage will be returned by the memory access request. In any event, the fetched data is then stored in the cache 130 with the MECID of the new access request.

FIG. 21 illustrates an example of an erasing mode of operation. In this mode of operation, when the mismatch is detected, the data of the mismatched line in the cache 130 is zeroed, scrambled, or randomised so that it is no longer intelligible. The line is thereby rendered unusable. Note that this is distinct from the operation of invalidating the cache line (e.g. by setting the validity flag 'V' to 0).

In this example, therefore, a mismatch is caused by the memory request to address 0x94130001, which hits on the cache line at address 0x941300. However, the mismatch occurs because the request has a MECID of 0x2142 while the cache line has a MECID of 0x7D04. The cache line having an address of 0x941300 is therefore (in this case) zeroed by setting all of the bits of the data to 0. The cache line can then be returned. Consequently, the unencrypted data is made inaccessible. Note that in this example, the cache line is not made invalid (although such a mode of operation could additionally set the cache line as invalid).

FIG. 22 illustrates an example of the overall process in the form of a flowchart 190. At a step 192, a memory access request is received by the storage circuitry 130. At step 194, it is determined whether or not there is a hit. If not, then at step 196, the request is forwarded further into memory hierarchy, e.g. towards main memory 150. The process then returns to step 192. Otherwise, at step 198, it is determined (e.g. by determination circuitry 180) whether a mismatch occurs between the MECIDs of the memory access request and the hitting entry in the storage circuitry 130. If not, then at step 200, the memory access request is completed (e.g. by reading or writing the relevant entry in the storage circuitry 130) and the request then proceeds to step 192. Otherwise, at step 202, it is determined what mode the system is operating in. If the system is in a poison mode of operation then at step 202 the entry in the storage circuitry 130 is poisoned as previously described. The process then proceeds to step 210. If the system is in a cleaning mode of operation, then at step 204, the entry in the storage circuitry 130 is cleaned and invalidated and the process then proceeds to step 210. If the system is in an erasing mode of operation, then at step 206 the entry in the storage circuitry 130 is zeroed or scrambled. The process then proceeds to step 210. These are all examples of error modes of operation in that the mismatch causes an error to be raised. In contrast, the aliasing mode of operation (shown FIG. 19) is not an error mode because it actively prevents a mismatch from occurring in the first place. Collectively, the error modes and the aliasing mode form the enabled modes of operation. The other mode of operation of the determination circuitry 180 is a disabled mode of operation in which, at step 208, the mismatch is simply disregarded and the request is completed. The process then proceeds to step 210.

After some of the enabled modes of operation, the process proceeds to step 210 where it is determined whether a synchronisation mode is also enabled. If so, then at step 212, an asynchronous exception is also generated (e.g. by writing to registers 12 associated with the processing circuitry 10 regarding the mismatch). In either event, the process then returns to step 192.

In each of the error modes of operation, the MECID of the mismatching entry may also be updated to the MECID of the incoming memory access request.

The apparatus may be able to switch between each or a subset of the enabled modes of operation and the disabled modes at runtime. Each of the enabled modes of operation are, of course, dependent and a system may comprise any combination of these. The disabled mode may also be present, or may be absent.

FIG. 23 illustrates the interaction between the enabled mode and speculative execution in the form of a flowchart 214. In speculative execution, instructions are executed before it is known whether those instructions ought to execution or not (e.g. pending the outcome of a branch instruction). Speculative reads could occur using the wrong MECID (as previously explained) and therefore it is desirable for one of the enabled modes to be active in order for speculative execution to take place. At a step 216, it is determined whether the determination circuitry 180 is in an enabled mode of operation or not. If so, then at step 218, speculative operation mode is enabled, that permits speculative reads and writes to take place. If not, then speculative operation mode is disabled. This prevents speculative read operations from taking place (and, in some embodiments, speculative write operations could also be prevented). In any event, the process then returns to step 216.

As an alternative to this process, the speculative operation mode could be enabled/disabled whenever the mode of operation of the determination circuitry 180 is changed rather than continually 'polling' for the current mode of operation of the determination circuitry 180.

FIG. 24 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier, together with the MECID register 94 described earlier. Similarly, storage circuit emulating program logic 148 maintains a data structure in a host address space of the host processor, which emulates the memory hierarchy. Hence, instead of data being stored in a level one cache 130, a level two cache 132, a level three cache 134, and a memory 150 as in the example of FIG. 10 (for instance), it is instead stored in the memory of the host processor 430, with the storage circuit emulating program logic 148 mapping memory addresses of instructions of the target code 400 to corresponding addresses for obtaining the simulated memory addresses from the host memory.

The simulation code includes address translation program logic 414 which emulate the functionality of the address translation circuitry or memory translation circuitry 16 respectively. Hence, the address translation program logic 414 translates virtual addresses specified by the target code 400 into simulated physical addresses in one of the PASs (which from the point of view of the target code refer to physical locations in memory), but actually these simulated physical addresses are mapped onto the virtual storage structures 130, 132, 134, 150 that is emulated by the storage circuit emulating program logic 148 by the address space mapping program logic 415. The determination program logic 151 is able to determine whether the MECID supplied as part of a simulated memory access request to a memory address matches the MECID associated with an entry in the simulated memory hierarchy 148 for that memory address and thereby performs the functionality of the determination circuitry 180 previously described. The storage circuit emulating logic 148 may emulate the point of encryption 64, and the point of physical aliasing 60 as previously described. The determination program logic 151 may determine whether a difference is detected between the encryption environment identifiers as previously discussed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry configured to perform processing in one of a fixed number of at least two domains, one of the domains being subdivided into a variable number of execution environments;

memory protection circuitry configured to use a key input to perform encryption or decryption on data of a memory access request, issued to a memory address, from within a current one of the domains; and memory translation circuitry configured to (i) translate the memory address from a virtual memory address to a physical memory address and (ii) to provide an encryption environment identifier used to generate the key input, wherein the key input is different for each of the domains and for each of the execution environments;

the key input for each of the domains is fixed at boot time of the apparatus; and the key input for each of the execution environments is dynamic; and the memory access request is forwarded from the memory translation circuitry to the memory protection circuitry with the encryption environment identifier.

2. The apparatus according to claim 1, wherein the memory translation circuitry is configured to store a plurality of page table entries, and to indicate the encryption environment identifier in response to performing a lookup on the virtual memory address on the plurality of page table entries.

3. The apparatus according to claim 1, wherein the memory translation circuitry comprises a plurality of encryption environment identifier registers; and the memory translation circuitry is configured to indicate which of the plurality of environment identifier registers is to be used to provide the encryption environment identifier.

4. The apparatus according to claim 1, wherein the encryption environment identifier is shared between a subset of the execution environments.

5. The apparatus according to claim 1, wherein the memory protection circuitry is configured to obtain the key input for one of the execution environments by performing a lookup using the encryption environment identifier provided by the memory access request.

6. The apparatus according to claim 5, wherein a result of the lookup is the key input in a form of a key.

7. The apparatus according to claim 5, wherein a result of the lookup is the key input in the form of a contribution used to perform the encryption or decryption.

8. The apparatus according to claim 1, wherein the memory address, to which the memory access request is issued, is a physical memory address in one of a plurality of physical address spaces; and each of the physical address spaces is associated with exactly one of the at least two domains.

9. The apparatus according to claim 1, wherein the memory address, to which the memory access request is issued, is a physical memory address in one of a plurality of physical address spaces; and each of the physical address spaces is associated with one of the at least two domains.

10. The apparatus according to claim 9, wherein the at least two domains include a root domain for managing switching between the at least two domains; and the plurality of physical address spaces include a root physical address space associated with the root domain, the root physical address space is separate from physical address spaces associated with the plurality of other domains.

11. The apparatus according to claim 10, wherein all of the plurality of physical address spaces are accessible from the root domain.

12. The apparatus according to claim 10, wherein the at least two domains comprise at least: a secure domain associated with a secure physical address space, and a less secure domain associated with a less secure physical address space;

the less secure physical address space is accessible from the less secure domain, the secure domain and the root domain; and the secure physical address space is accessible from the secure domain and the root domain and is inaccessible from the less secure domain.

13. The apparatus according to claim 11, wherein the one of the at least two domains is a realm domain associated with a realm physical address space; and the realm physical address space is subdivided into the variable number of sub-area physical address spaces.

14. The apparatus according to claim 13, wherein the less secure physical address space is accessible from the realm domain; and the realm physical address space is accessible from the realm domain and the root domain and is inaccessible from the less secure domain.

15. The apparatus according to claim 13, wherein the realm physical address space is inaccessible from the secure domain; and the secure physical address space is inaccessible from the realm domain.

16. The apparatus according to claim 12, wherein the less secure physical address space is accessible from all of the at least two domains.

17. A method comprising:

performing processing in one of a fixed number of at least two domains, one of the domains being subdivided into a variable number of execution environments;

using, by memory protection circuitry, a key input to perform encryption or decryption on data of a memory access request, issued to a memory address, from within a current one of the domains;

translate, by memory translation circuitry, the memory address from a virtual memory address to a physical memory address; and provide, by the memory translation circuitry, an encryption environment identifier used to generate the key input, wherein the key input is different for each of the domains and for each of the execution environments;

the key input for each of the domains is fixed at boot time of the apparatus;

the key input for each of the execution environments is dynamic; and the memory access request is forwarded from the memory translation circuitry to the memory protection circuitry with the encryption environment identifier.

18. A non-transitory storage computer readable storage medium comprising a computer program for controlling a host data processing apparatus to provide an instruction execution environment for execution of target code, the computer program comprising:

processing program logic configured to simulate processing of the target code in one of at least two domains, one of the domains being subdivided into a variable number of execution environments; and memory protection logic configured to use a key input to perform encryption or decryption on data of a memory access request, issued to a memory address, from within a current one of the domains; and memory translation protection logic configured to (i) translate the memory address from a virtual memory address to a physical memory address and (ii) to provide an encryption environment identifier used to generate the key input, wherein the key input is different for each of the domains and for each of the execution environments;

the key input for each of the domains is fixed at boot time of the apparatus;

the key input for each of the execution environments is dynamic; and the memory access request is forwarded from the memory translation protection logic to the memory protection logic with the encryption environment identifier.

* * * * *